US010392274B2

(12) United States Patent
Unger et al.

(10) Patent No.: US 10,392,274 B2
(45) Date of Patent: Aug. 27, 2019

(54) DEVICE FOR ELECTROCOAGULATION AND PROCESS

(71) Applicant: HOGANAS AB (PUBL), Hoganas (SE)

(72) Inventors: Kyle Unger, New Castle, PA (US); Madan Tandukar, Johnstown, PA (US); Paul Endler, Davidsville, PA (US)

(73) Assignee: HÖGANÄS AB (PUBL), Höganäs (SE)

( * ) Notice: Subject to any disclaimer, the term of this patent is extended or adjusted under 35 U.S.C. 154(b) by 0 days.

(21) Appl. No.: 15/699,307

(22) Filed: Sep. 8, 2017

(65) Prior Publication Data

US 2018/0072594 A1 Mar. 15, 2018

Related U.S. Application Data

(60) Provisional application No. 62/385,697, filed on Sep. 9, 2016.

(30) Foreign Application Priority Data

Oct. 19, 2016 (EP) .................... 16194603

(51) Int. Cl.
*C02F 1/46* (2006.01)
*C02F 1/461* (2006.01)
(Continued)

(52) U.S. Cl.
CPC .......... *C02F 1/46109* (2013.01); *C02F 1/463* (2013.01); *C02F 1/4678* (2013.01);
(Continued)

(58) Field of Classification Search
CPC .... C02F 1/46109; C02F 1/4678; C02F 1/463; C02F 2101/106; C02F 2101/103;
(Continued)

(56) References Cited

U.S. PATENT DOCUMENTS 3,523,891 A * 8/1970 Mehl .................. C02F 1/46104
 204/269
4,014,766 A 3/1977 Watanabe et al.
(Continued)

FOREIGN PATENT DOCUMENTS

EP 0015057 A2 9/1980
EP 0595178 A1 5/1994
(Continued)

OTHER PUBLICATIONS

International Search Report (Form PCT/ISA/210) dated Nov. 8, 2017, by the European Patent Office in corresponding International Application No. PCT/EP2017/072549. (5 pages).
(Continued)

*Primary Examiner* — Arun S Phasge
(74) *Attorney, Agent, or Firm* — Buchanan Ingersoll & Rooney P.C.

(57) ABSTRACT

A device for electrocoagulation to treat a process stream, such as water, wastewater, or industrial waste. Also, a method to treat a process stream, such as water or wastewater, or industrial waste, utilizing said device. An electrocoagulation device configured to treat a process stream, the device including a cathode; an anode, wherein the anode is porous and water permeable; and a pressure system, wherein the pressure system is configured to flow at least 95% of the process stream through the anode.

19 Claims, 13 Drawing Sheets

(51) Int. Cl.
*C02F 1/463* (2006.01)
*C02F 1/467* (2006.01)
*C02F 101/10* (2006.01)
*C02F 101/14* (2006.01)
*C02F 101/22* (2006.01)

(52) U.S. Cl.
CPC ............... *C02F 2001/46133* (2013.01); *C02F 2001/46161* (2013.01); *C02F 2101/103* (2013.01); *C02F 2101/106* (2013.01); *C02F 2101/14* (2013.01); *C02F 2101/22* (2013.01); *C02F 2201/4611* (2013.01); *C02F 2201/4613* (2013.01); *C02F 2301/06* (2013.01)

(58) Field of Classification Search
CPC .... C02F 2201/4611; C02F 2001/46161; C02F 2001/46133; C02F 2101/14; C02F 2201/4613
See application file for complete search history.

(56) References Cited

U.S. PATENT DOCUMENTS

| | | | |
|---|---|---|---|
| 4,194,972 | A | 3/1980 | Waintraub et al. |
| 2005/0167285 | A1 | 8/2005 | Pushpavanam et al. |
| 2005/0218081 | A1* | 10/2005 | Dmitriev ............. B01D 17/005 210/702 |
| 2006/0000784 | A1 | 1/2006 | Khudenko |
| 2010/0326841 | A1 | 12/2010 | Blum |
| 2012/0055871 | A1 | 3/2012 | Fresnel |
| 2012/0118757 | A1 | 5/2012 | Mehl |

FOREIGN PATENT DOCUMENTS

| | | |
|---|---|---|
| SU | 981241 | 12/1982 |
| SU | 1255580 A1 | 9/1986 |
| WO | 2013/059964 A1 | 5/2013 |
| WO | 2014/184106 A1 | 11/2014 |

OTHER PUBLICATIONS

Written Opinion (Form PCT/ISA/237) dated Nov. 8, 2017, by the International Searching Authority in corresponding International Application No. PCT/EP2017/072549. (8 pages).

International Search Report dated Jul. 5, 2017, by the European Patent Office in corresponding European Application No. 16 19 4603. (2 pages).

Written Opinion (EPO Form 1703 01.91 TRI) by the European Patent Office in corresponding European Application No. 16 194 603.3. (5 pages).

* cited by examiner

DEVICE FOR ELECTROCOAGULATION AND PROCESS

CROSS REFERENCE TO RELATED APPLICATIONS

The present application claims the benefit of U.S. Provisional Application No. 62/385,697, filed on Sep. 9, 2016, and claims the benefit of European Application No. 16194603.3, filed on Sep. 19, 2016. The entire contents of each of U.S. Provisional Application No. 62/385,697 and European Application No. 16194603.35 are hereby incorporated herein by reference in their entirety.

TECHNICAL FIELD

Embodiments of the present invention relate to a device for electrocoagulation. The device may be used to treat process streams, such as contaminated water, wastewater, and industrial waste. Embodiments of the present invention further related to an electrocoagulation process for removing pollutants from process streams by use of the device.

SUMMARY

One aspect of the present invention is a new device for electrocoagulation to treat process streams, such as contaminated water, wastewater, and industrial waste. The device contains a porous and permeable sacrificial anode contained in a pressurized system, such as a pressurized piping system.

The anode may contain compacted iron powder. In some embodiments, the anode may be a compacted and sintered iron powder while, in other embodiments, the anode is compacted but not sintered. Instead of, or in addition to, a sintering step, the anode may be heat treated, e.g. at temperatures between 200-400° C., in order to burn away lubricants.

Another aspect of the present invention is a process for the removal of contaminants in process streams, such as water, wastewater, or industrial waste, through electrocoagulation utilizing said device. Typical industrial wastes include mining, textile, metal plating, tannery, microelectronics, pulp & paper and distillery. The process stream may be a water containing fluid, such as ground water, river water, industrial waste water, civic waste water and/or surface water, for reducing the content of contaminants selected from the group consisting chlorine containing compounds, nitrates, nitrites, heavy metals, toxic inorganic substances, toxic organic compounds, microorganisms and/or combinations thereof in the fluid.

Certain aspects and embodiments of the present invention are especially suitable for facilitating reduction of multiple contaminants. Target contaminants could consist of, but are not limited to, chromium, arsenic, lead, fluoride, selenium, radionuclides, nitrogen species, heavy metals, phosphorus and organic compounds.

Certain aspects and embodiments of the present invention are suitable to facilitate at least the same reduction of a contaminant, while using less power than a conventional system. In particular, certain aspects and embodiments of the present invention additionally provide a high integrity of the anode and, hence, an improved ease of handling.

BACKGROUND

Electrocoagulation is a simple and effective method of generating metal hydroxide coagulants within water/wastewater by electro-oxidation of metals, such as iron and aluminum. Schematic and basic concept of electrocoagulation is presented in FIG. 19. When current is passed through the system, metal ions are released from a sacrificial anode, whereas hydroxide ions and hydrogen gas are produced at the cathode. The metal ions and hydroxide ions readily combine to form polymeric metal hydroxides, which are excellent coagulants.

Reactions that occur at the anode, cathode and bulk liquid are shown below with iron and/or aluminum as anode material.

At the anode:
Oxidation of metal:

$$Fe(s) \rightarrow Fe^{2+} + 2e^-$$

$$Fe^{2+} \rightarrow Fe^{3+} + e^-$$

Oxidation of water:

$$2H_2O \rightarrow O_2 + 4e^- + 4H^+$$

At the cathode:
Production of hydrogen gas and hydroxide ions:

$$2H_2O \rightarrow H_2 + 2OH^-$$

$$4e^- + 4H^+ \rightarrow 2H_2$$

In bulk liquid:
Formation of metal hydroxides:

$$Fe^{2+} + 2OH^- \rightarrow Fe(OH)_2$$

$$Fe^{3+} + 3OH^- \rightarrow Fe(OH)_3$$

For an aluminum anode, the corresponding oxidation of the metal will be:

$$Al(s) \rightarrow Al^{3+} + 3e^-$$

and in bulk liquid the formation of metal hydroxide will be:

$$Al^{3+} + 3OH^- \rightarrow Al(OH)_3$$

Depending of the bulk liquid pH, mono- and polyhydroxides of the metals can be formed as follows:

$$Fe(OH)_2^+, Fe(OH)^{2+}, Fe(OH)_2, Fe(OH)_3, Fe(OH)_6^{3-}, Fe(OH)_4^-,$$

and when aluminum is used as anode material examples of formed hydroxides are:

$$Al(OH)_2^+, Al(OH)_3, Al(OH)_4^-, Al_{13}(OH)_{34}^{5+}, Al_{13}(OH)_{32}^{7+}$$

The metal hydroxides form flocculants and remove the contaminants by ion exchange, adsorption, neutralization and sweep-floc action. Metal cations neutralize negative surface charges of colloidal particles and pollutants. Then the particles approach closer and agglomerate under the influence of van der Waals forces. Besides various types of ions, organic substances may effectively be removed in the form of sediment flocs by electrocoagulation. Factors such as current density, pH, electrode type, reaction time, etc., play important roles in the formation of metal hydroxides. Generally, higher current density produces more metal ions in the solution. Likewise, solubility of the metal hydroxides largely depends on pH of the solution. Optimum pH range for the formation of iron and aluminum hydroxide flocculants is between 5 and 8. However, the flocs become soluble at lower or higher pH values. pH is equally important for the interaction of metal flocculants with pollutants. For example, removal of fluoride by aluminum hydroxide is thought to be an ion exchange process. Fluoride ion replaces one hydroxide ion from aluminum hydroxide and makes a complex according to the following reaction:

$$Al(OH)_3 + xF^- \rightarrow Al(OH)_{(3-x)}F_x(s) + OH^-$$

The following equations provide theoretical relationships between fundamental characteristics of the electrocoagulation process applicable to the invented process and the invented device.

Theoretical Anode Material Consumption

In the electrocoagulation process, anode is sacrificial and loses mass over time. Loss of anode mass is a function of charge loading (electric current) and electrode type. Theoretical mass loss can be computed using the following equation:

$$Mm = IMw*60/zF$$

where, Mm is the anode mass loss per minute (g*min$^{-1}$), I is the current (A), Mw is the molecular weight of the metal (g*mol$^{-1}$), z is the number of electrons released during the metal oxidation (2 or 3 for Fe and 3 for Al) and F is Faraday's constant (96,486 C*mol$^{-1}$). Based on the above equation, whenever one Faraday of charge is passed through the circuit, 8.99 g of aluminum and 18.6 g of iron are dissolved into the solution from the anode. The loss in anode mass directly affects pollutant removal.

Theoretical Energy Consumption, Conductivity, and Faradic Yield

Energy consumption depends on voltage difference applied across the electrodes, current, and reaction time. On the other hand, reaction time depends on the pollutant concentration. Energy consumption per mass of pollutant removal can be calculated using the following equation:

$$Ec = VItr/Cr$$

Where Ec is the total energy consumption per mass of pollutant removed (kWh*g$^{-1}$), V is the cell potential (V), I is the current (A), tr is the reaction time, and Cr is the mass of pollutant removed in time tr. At constant applied cell potential, current through the circuit depends on the conductivity of the water. Most of the groundwater and wastewater have high enough conductivity to ensure sufficient current flow for the reaction. However, in some cases, addition of secondary electrolytes could be helpful to raise conductivity of the water and hence the flow of current. Secondary electrolytes that give chloride ions are especially helpful as chloride ions help to remove some masking agents that coats anode surface over time. This masking phenomenon can largely reduce the system efficiency. Examples of secondary electrolytes also used as anti-masking agents are potassium chloride or sodium chloride. System efficiency can be evaluated by calculating Faradic yield or current efficiency (CE), which is defined as the ratio of actual anode consumption (Ma) to the theoretical value (Mt), which can be calculated according to:

$$CE(\%) = Ma*100/Mt$$

Actual anode loss can be quantified by gravimetric analysis of dry anode before and after the reaction. In reality, Faradic yield might be higher than 100% because of spontaneous oxidation of metal in water.

Theoretical Production of Electrocoagulation Sludge

The electrocoagulation process produces flocs that eventually agglomerate and settle at the bottom of the reaction chamber as sludge. Metal hydroxide like Al(OH)$_3$ has high chemical and physical affinity towards water. As a result, the electrocoagulation sludge has high water content although having good settleability. Mass of sludge produced per minute (g*min$^{-1}$) can be calculated considering the following equation:

$$Sm = (60*I*(Mw/z+17))/F$$

The amount of sludge produced during the process can also be quantified by gravimetric method at the end of the process.

Theoretical Production of Hydrogen Gas

The electrolysis of water at cathode produces hydrogen gas. Volume of hydrogen gas produced depends on the number of electrons delivered by the cathode. According to the reaction stoichiometry, two moles of electrons are consumed for the production of one mole hydrogen gas. Number of moles of electrons (Me$^-$) released by the cathode during the reaction time of tr (sec) can be calculated using the following equation:

$$Me^- I*tr/F$$

Based on the above, volume of hydrogen gas (VH$_2$) in ml, produced during the reaction time of tr (sec) at temperature T (K) and pressure P (atm) can be calculated using the following equation:

$$VH_2 = (11,207*I*tr/273.15)/(F*P)$$

This equation calculates the volume of hydrogen gas produced from the process when there is no competing ion for electrons at the cathode. If competing ions such as, hexavalent chromium ions, are present, hydrogen gas production will be lower than the theoretical value. Hydrogen gas is a useful byproduct of the electrocoagulation process.

In the patent literature a number of processes and materials related to electrocoagulation for remediating of water or wastewater are disclosed. The following examples of published documents may be regarded as relevant art to embodiments of the present invention.

US2012/0055871 relates to an electrolysis method that uses iron particles and an aqueous solution containing sodium hypochlorite. The method is characterized in that it uses direct current, the iron particles from the anode and the sodium hypochlorite concentration of the aqueous solution is at least 1 g/L. The document further relates to a method and to a plant for the pretreatment of raw water for producing water that can be easily treated in order to produce drinkable water or so called technical water.

US2005/0167285 provides an electrochemical method for the removal of arsenate from drinking water, wherein the arsenate is removed by adsorption to metal hydroxide, formed by "in-situ" anodic oxidation. The application describes an electrochemical cell fitted with an anode of mild steel or aluminum plate and stainless steel cathode with an inter-electrode distance of 0.5 to 1.5 cm.

EP0595178A1 describes a device and a process for electrolytic treatment of waste water. The water to be purified and treated first flows through at least one anode chamber containing an insoluble anode and then through another anode chamber containing a soluble permeable anode. Coke particles are added before water enters the soluble anode chamber to initiate a galvanic coagulation process. The porous sacrificial anode can be made of iron filings.

U.S. Pat. No. 4,014,766 discloses a process wherein wastewater is subjected to electrolysis in an electrolytic cell having an anode comprising an insoluble central electrode and a body of particulate iron pieces disposed there around and in electrical contact therewith, whereby impurities in the wastewater become occulted within flocculants of iron hydroxide formed by electrolytic dissolution of the iron pieces, and the flocculants containing the impurities is subjected to oxidation processing and is thereafter separated. A magnetic field can be applied to the wastewater thus treated thereby to promote sedimentation of the flocculants. Reduction of hexavalent chromium ions to trivalent chromium ions can be carried out efficiently in neutral or alkaline condition without using acidic condition which was the case when iron plates were used.

US2006/0000784 describes a method of water or wastewater treatment for removal of pollutants in at least two-step process comprising:
(a) treatment of water producing at least partially treated intermediate effluent,
(b) treatment of the intermediate effluent with a sacrificial metal and producing ions of said sacrificial metal, and providing very thoroughly treated effluent,
(c) recuperating sacrificial metal ions generated in step (b) and recycling the recuperated ions in the step (a), the recuperated and recycled ions from the step (c) improve treatment efficiency of step (a) by additionally removing pollutants from the intermediate effluent using recuperated ions, resulting in cleaner intermediate effluent and therefore the pollutant loading in step (b) is reduced, intermediate effluent is further treated more thoroughly, and the demand for sacrificial metal in step (b) is reduced. Step (a) can preferably be biological, biological-abiotic, physical chemical or combinations of these steps.

A variety of pollutants is supposed to be removed such as heavy metals, organic compounds, dissolved substances, suspended solids, solid particles, nutrients, ammonia, nitrates, nitrites phosphates, microorganisms etc.

WO2013/059964 A1 describes a self-assembling high surface area electrode which includes an electrode substrate, magnetic electrode particles and a magnetic field source. Under the influence of the magnetic field source, the magnetic particles assemble on the surface of the electrode substrate. The electrode can be used as an anode and/or a cathode in an electrocoagulation system for treating contaminated feed water. The document further mentions that a suitable material for the magnetic electrode particles is iron particles.

EP0015057A2 describes an embodiment which provides electrodes for water electrolyzers that are cheaper than electrodes composed wholly of sintered particles and gives as good, or lower overpotentials in the release of gases compared to electrodes composed wholly of sintered materials. The electrodes according to this document have an impervious, electrically conductive substrate, and bonded to the substrate, a porous metallurgically bonded layer, 25-275 µm thick, made of nickel, nickel-iron alloy, iron or iron-carbon alloy particles having a diameter of 2 to 30 µm that are sintered to a theoretical density from 45 to 65%.

WO2014184106 discloses an electrochemical cell for electrocoagulation containing a sacrificial electrode. The sacrificial electrode contains a non-sacrificial part and a porous sacrificial part containing iron powder.

SU981241 relates to the purification of sewage in electro-coagulators. The aim of the invention is to increase productivity by increasing the release of coagulant in form of a trivalent iron salt. An electrode is disclosed consisting of an insoluble part and a soluble part containing iron filings.

SU1255580A1 describes a method of electrochemical purification of sewage containing chromium. The description enables reduction of specific energy consumption.

Electrocoagulation has been used for a number of years and has been proven to be an efficient method for removal of various pollutants from water and wastewater. However, there is still a need for improving the process, especially considering the energy efficiency. Embodiments of the present invention may provide an improvement of the electrocoagulation process in terms of higher energy efficiency and considerably reduced hydraulic retention time enabling a compact and less space demanding process equipment, i.e. reduced footprint.

Summary of Various Aspects and Embodiments of the Present Invention

Embodiments of the present invention include a device for electrocoagulation configured to treat a process stream, such as contaminated water, wastewater, or industrial waste. The device may contain a sacrificial anode and a cathode. Embodiments of the present invention also include a process for reducing the amount of pollutants in a process stream, such as contaminated water, wastewater, or industrial waste.

In an embodiment, the process stream is pressurized and forced through the permeable anode. In an embodiment, the pressure to be applied shall be enough to fill at least 95 vol %, preferably at least 99 vol %, preferably 99.9 vol %, or all pores and cavities of the anode and in addition yielding sufficient flow rate of the process stream through the system as defined by $K_{sat}$ values.

Aspects of the present invention relate to an electrocoagulation device configured to treat a process stream, the device comprising:
a cathode;
a sacrificial anode consisting of a compacted powder comprising iron and having a porosity between 11% and 62% by volume, preferably between 22% and 51% by volume, more preferably between 30-42% by volume, wherein said anode is porous and water permeable; and
a pressure system, wherein the pressure system is configured for the process stream to flow through said anode,
wherein said anode has a first side and an opposite second side, wherein the process stream flows from the first side through said anode to the second side, and wherein a pressure of the process stream on the second side is less than the pressure on the first side, such that a pressure differential is at least 6.9 kPa (1 psi), preferably at least 17.9 kPa (2.6 psi).

In some embodiments, the pressure system is configured such that at least 50%, preferably 80 wt %, more preferably 95 wt %, and most preferably at least 99.5 wt %, of the process stream flows through said anode.

In some embodiments, the pressure of the process stream on the first side is at least 13.8 kPa (2 psi).

In some embodiments, said anode consists of compacted and sintered powder.

In some embodiments, the compacted powder comprises at least 90% by weight of iron, preferably at least 95% by weight of iron and most preferably at least 97% by weight of iron.

In some embodiments, the compacted powder comprises iron powder that has a particle size distribution such that the amount of particles below 45 µm being at most 10% by weight, between 45 and 150 µm being 0-20% by weight, between 150 and 212 µm being 10-50% by weight, between 212 and 500 µm being 50-90% by weight and above 500 µm being 0-30% by weight. In some embodiments, said iron powder has a particle size distribution such that the amount of particles below 45 µm being at most 5% by weight, between 45 and 150 µm being 0-20% by weight, between 150 and 212 µm 10-30% by weight, between 212 and 500 µm being 60-90% by weight and above 500 µm being 0-10% by weight.

In some embodiments, said anode comprises a mixture of compacted iron powder and aluminum powder. In some embodiments, the weight ratio between iron powder and aluminum powder 50:50 to 98:2, preferably 60:40 to 98:2, and most preferably 70:30 to 95:5.

According to another aspect, disclosed herein is a process for treating a process stream by electrocoagulation containing the following steps:
 providing an electrocoagulation device as disclosed above and in the following,
 passing the process stream through the device by pressurizing the process stream before passing through said anode, while supplying an electric potential difference between said anode and said cathode.

According to some embodiments, when said anode and cathode are identical in structure, the process further comprises the step of:
 switching polarity when a sacrificial part of said anode at least partly is consumed.

According to some embodiments, the process stream is pressurized above atmospheric pressure before passing through said anode.

According to some embodiments, said anode has a $K_{sat}$ value of above 0 and up to 19 cm/day, preferably between 4 and 17.5 cm/day, more preferably between 4.3 and 16.4 cm/day and most preferably between 7.6 and 13 cm/day. Ksat denotes the saturated hydraulic conductivity, which describes the ease with which a fluid can move through pores in a saturated pore structure.

According to some embodiments, the process further comprises, prior to, and/or during the process of passing the process stream through the device, adjusting pH to a value which prohibits dissolution of formed hydroxide flocculants, preferably to a value between 5 and 8.

According to some embodiments, the process stream comprises heavy metals such as chromium or arsenic.

According to some embodiments, the process stream comprises fluoride.

According to another aspect an electrocoagulation device as disclosed above and in the following is configured for treating contaminated water or waste water; wherein the cathode and the anode are contained in a pressurized piping system, and wherein the electrocoagulation device further comprises:
 a system for supplying electricity to the electrodes,
 a system for handling flocs.

BRIEF DESCRIPTION OF DRAWINGS

In FIG. 18A, the $K_{sat}$ values of zone D are indicated while, in FIG. 18B, the $K_{sat}$ values of zones C-E are indicated.

DETAILED DESCRIPTION

Figure 1:
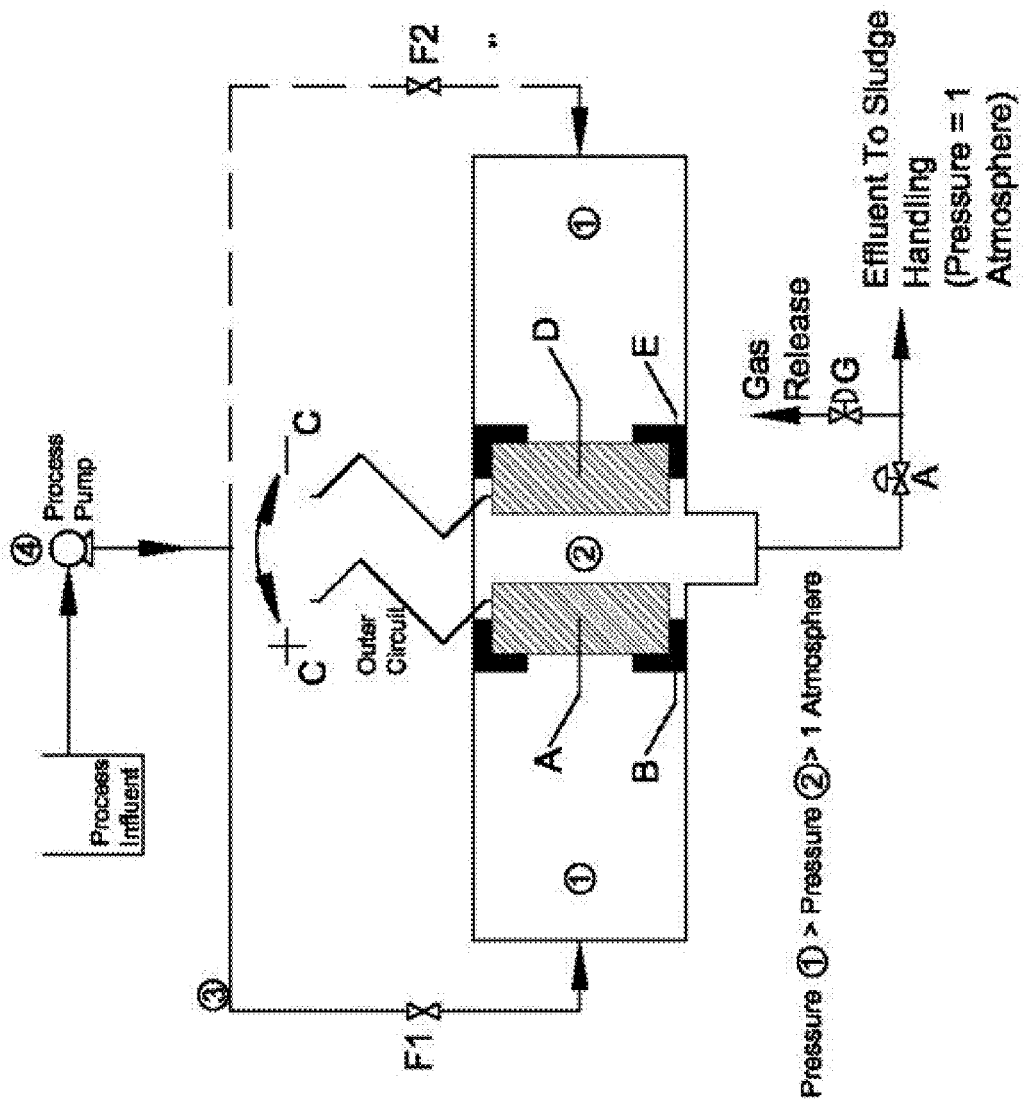
FIG. 1 shows an embodiment of the electrocoagulation process according to the present invention. In this embodiment, the sacrificial electrode and the cathode have the same composition and have the same shape.

FIG. 1 shows a process stream 3 to be treated. The process stream 3 is pressurized by a process pump 4, flowing in the tube 1. The process stream 3 flows through the porous sacrificial anode A, fixed by an anode holder B. The anode holder B seals the tube 1 so that all, or essentially all (such as, at least 50%, preferably 80 wt %, more preferably 95 wt %, and most preferably at least 99.5 wt %) of the process stream 3 flows through the anode A.

"Flows through" means that the process stream 3 flows from side 1 of the anode A through to an opposite side 2 of the anode A. Flow through is distinguished from a flow path where a process stream flows across/along a surface of an anode.

The process stream 3, on side 1 of the anode A, is at pressure P1 that is great than atmospheric pressure, A differential pressure across the anode is preferably at least 6.9 kPa (1 psi) and more preferably at least 17.9 kPa (2.6 psi). After flowing through the anode A to side 2, the process stream 3 is at a pressure P2 that is preferably greater than atmospheric pressure, preferably at least 103 kPa (15 psi) and more preferably 138 kPa (20 psi). The pressure P1 is greater than the pressure P2.

The anode A is connected to the positive pole of a direct current source C. The cathode D is connected to the negative pole of the direct current source C.

In an embodiment, the electrodes are switchable, wherein anode A becomes the cathode and cathode D becomes the sacrificial anode. The cathode D has, in this embodiment, the same shape and composition as the anode, which allows for an effective switch of electrodes at an appropriate moment. In other embodiments, electrodes A and D may have the same composition, but different structures; different compositions, but the same structure; or different compositions, and different structures.

The cathode D is fixed by a cathode holder E. After the electrodes are switched, the cathode holder E seals the tube 1 so that all, or essentially all (such as, at least 50%, preferably 80 wt %, more preferably 95 wt %, and most preferably at least 99.5 wt %) of the process stream 3 flows through the cathode D (now a sacrificial anode). The process stream 3 to be treated flows through opened valve F1, the valve F2 being closed. When the electrodes are switched, the process stream 3 flows through the opened valve F2, the valve F1 being closed.

After passing the sacrificial anode the process stream 3 flows through valve G, a gas release station, and further to a sludge handling unit (not shown), where contaminant containing sludge is separated from the cleaned water.

In an embodiment, the holders B, E may be made of any water-impermeable material, such as a rubber or polymer.

In an embodiment, the electrodes A, D may be configured to tightly fit in tube 1, or against an abutment surface of tube 1. This may allow an arrangement wherein a separate holder is not used to seal tube 1. If the electrodes A, D are used without a seal, the arrangement of the electrodes A, D and the tube 1 should be configured such that, under process pressures, all, or essentially all (such as, at least 50%, preferably 80 wt %, more preferably 95 wt %, and most preferably at least 99.5 wt %) of the process stream 3 flows through the electrodes A,D.

A preferred I/Q level is less than 380 $A/m^3/hr$, preferably less than 350 $A/m^3/hr$, more preferably less than 340 $A/m^3/hr$, more preferably less than 330 $A/m^3/hr$, where I is the applied current and Q the flow rate.

In an embodiment, the device will allow electrocoagulation of a continuous flow of process stream.

Figure 2:
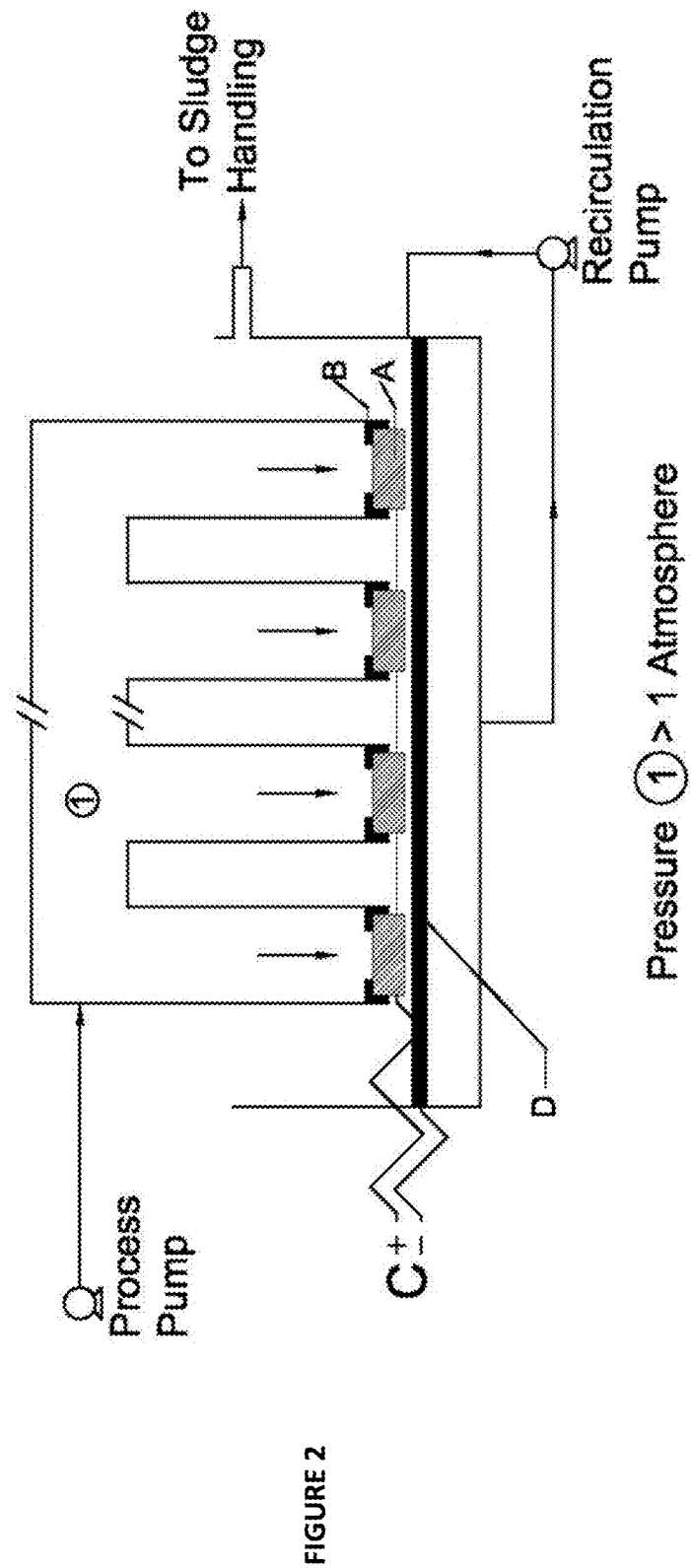
FIG. 2 shows another embodiment of the present invention with multiple sacrificial anodes and a single cathode, different in composition and shape from the sacrificial anodes.

FIG. 2 shows another embodiment of the installation. In this embodiment, the installation contains a plurality of sacrificial anodes A, and a single cathode D. In this embodiment, the cathode D may be different in composition and/or shape compared to the anodes A. The process stream 3 flows through each anode A. Each anode A is fixed by an anode holder A, that may seal the tubes so that all, or essentially all (such as, at least 50%, preferably 80 wt %, more preferably 95 wt %, and most preferably at least 99.5 wt %) of the process stream 3 flows through an anode A. Preferably each anode A is essentially the same. However, in an embodiment, the anodes A may include anodes of different composition and/or shape.

In this embodiment, the electrodes and current is not configured to be reversed.

FIG. 2 also shows a recirculation loop wherein a part of the process stream 3 passing the anodes A is recirculated to pass the sacrificial anodes for a further run through the sacrificial anodes A.

In this embodiment, a single anode A may be used. It is preferred that a recirculation loop is used when only a single anode A is used.

In this embodiment, multiple cathodes A may be used.

Figure 3:
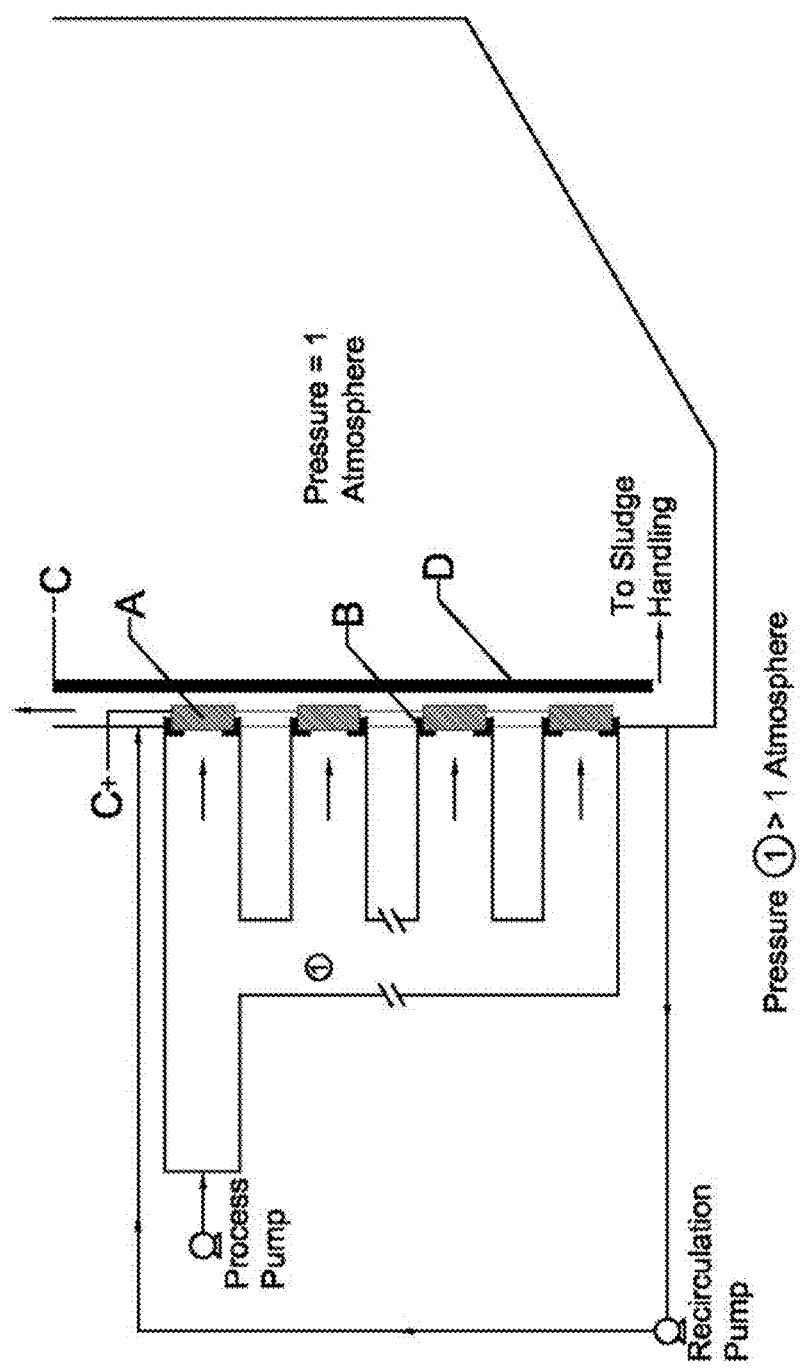
FIG. 3 shows a further embodiment according to the present invention similar to the embodiment shown in FIG. 2, with an exception of that the sacrificial anodes and the cathode are shifted 90 degrees, i.e. a vertical set up.

FIG. 3 shows a similar installation as shown in FIG. 2, with an exception that the electrodes are turned 90 degrees, i.e., a vertical installation.

In embodiments, a sacrificial anode is connected to the positive pole of the current source. Cations are released from the anode into the solution and transported to the negative cathode where hydrolysis takes place producing hydroxide ions and hydrogen gas, electrons travel from the anode through an outer circuit to the cathode causing electrolysis of water and reduction of cations. An example of reduction of metal ion pollutants is reduction of $Cr^{6+}$ ions to $Cr^{3+}$ ions, competing with the hydrolysis. Likewise, arsenic is reduced from $As^{5+}$ to $As^{3+}$, selenium from $Se^{6+}$ to $Se^{4+}$, and uranium from $U^{6+}$ to $U^{4+}$.

Iron Powder

Suitable iron powders to be used in the sacrificial anode may be atomized iron powders, such as water atomized iron powders, and chemically reduced iron powders such as CO reduced or $H_2$ reduced.

The Fe content of the iron powder may preferably be above 90% by weight.

Particle size of the iron powder may preferably be chosen so that a porous structure of the sacrificial anode is obtained. Powders having too fine particle size are less suitable as such powders tends to be less permeable for liquids, on the other hand too coarse particles have less surface to volume ratio which hinders the release of positive ions to the water to be treated.

Coarser iron powder may also be difficult to compact into bodies having sufficient strength and porosity. Suitable powder may have a particle size distribution between 10 µm and 1 mm and an apparent density as measured according to ISO 3923-1:2008 between 0.8-3.0 $g/cm^3$. The specific surface area may be between 0.1 and 0.5 $m^2/g$ as measured according to BET.

A preferred iron powder to be used may have a content of Fe of at least 90% by weight, preferably at least 95% by weight, most preferably at least 97% by weight. The remaining elements in the iron powder being oxygen at content of up to 3% by weight, preferably up to 2.5% by weight and other inevitable impurities.

The amount of oxygen and other inevitable impurities depends on raw material used for the production of the iron powder and on the production method. Examples of inevitable impurities besides oxygen are C, S, P, Si, Mn, Cr, Cu, Mo, Ni, Al at a total content below 2% by weight, preferably below 1% by weight and most preferably below 0.5% by weight.

In a preferred embodiment the amount of particles below 45 μm being at most 10% by weigh. The amount of particles between 45 and 150 μm being 0-20% by weight. The amount of particles between 150 and 212 μm being 10-50% by weight. The amount of particles between 212 and 500 μm being 50-90% by weight. The amount of particles above 500 being 0-30% by weight.

In another preferred embodiment the amount of particles below 45 μm being at most 5% by weight. The amount of particles between 45 and 150 μm being 0-20% by weight. The amount of particles between 150 and 212 μm being 10-30% by weight. The amount of particles between 212 and 500 μm 60-90% by weight. The amount of particles above 500 μm being 0-10% by weight.

In a preferred embodiment the iron powder is a $H_2$ reduced iron powder.

The Apparent Density may be between 0.8-3.0 $g/cm^3$, preferably between 0.8 and 2.5 $g/cm^3$, most preferably between 1.2-1.8 $g/cm^3$. The specific surface area may be between 0.1 and 0.5 $m^2/g$ measured according to BET.

Aluminum Powder

In embodiments where Al powder is contained in the sacrificial part of the electrode the content of Al in the Al powder may preferably be between 90 and 99% by weight and the particle size distribution between 4.5 and 875 μm.

Mixture of Iron Powder and Aluminum Powder

It has been shown that the combination of iron and aluminum in the sacrificial anode yields a combined effect of effective fluoride removal and sufficient settling velocity of the coagulants formed.

The weight ratio between iron powder and aluminum powder in embodiments containing both powders may be minimum 50:50, preferably minimum 60:40, most preferably minimum 70:30 in order not to result in unaccepted high residues of aluminum ions in the processed water and prolonged settling. On the other hand the maximum weight ratio between iron powder and aluminum powder in embodiments containing both powders may be 98:2, preferably 95:5, in order to achieve sufficient fluoride removal capacity. Thus the weight ratio between iron powder and aluminum powder may be 50:50 to 98:2, preferably 60:40 to 98:2, and most preferably 70:30 to 95:5. This can also be expressed as that the content of aluminum powder in the sacrificial part of the electrode may be 2-50% by weight, preferably 2-40% by weight, most preferably 5-30% by weight. Also, for example, 10-30% by weight or 15-25% by weight of aluminum powder.

Manufacture of the Permeable and Porous Anode

The iron powder or a mixture of the iron powder and aluminum powder is transferred to a compaction die and compacted. Preferably, the anode is compressed with a force of at least 10 MPa, preferably at least 20 MPa, more preferably at least 25 MPa. In some embodiments, the iron powder or a mixture of iron powder and aluminum powder is compacted at a pressure between 27.6 MPa (2 TSI) and 986 MPa (71.5 TSI) to obtain sufficient porosity and integrity and strength. This implies that the permeable (liquid and gas) anode should have a porosity of 11-62%, preferably between 22-51%, and most preferably between 30-42%.

A conventional lubricant may be added before compaction in order to facilitate compaction and ejection of the compacted anode. In order to further enhance the integrity and strength of the anode a sintering step may be performed. However, what may be of more interest is a heat treatment of the anode at a temperature between 200-400° C. in order to burn away lubricants.

The shape of the compacted or optionally sintered anode is chosen so as to fit in the piping system and, if present, a non-conductive impermeable seal. Such non-conductive impermeable seal may be a conventional non-conductive gasket.

Electrocoagulation Process

The electrocoagulation process according to embodiments of the present invention utilizes the described device. The process stream to be cleaned is flowed through the permeable and porous sacrificial anode. Normally DC is applied; however AC may be used, especially when anode and cathode are substantially identical in structure. Use of AC may mitigate fouling problems and simplify the electrical equipment.

The applied pressure may be enough to fill at least 95%, preferably 99%, preferably 99.9%, preferably all of the pores and cavities of the anode and give a sufficient flow rate through the system.

Substantial decrease of the hydraulic retention time can be obtained for the process according to an embodiment of the present invention compared to known electrocoagulation processes, for the same removal efficiency.

The hydraulic retention time is here defined as volume of the permeable and porous sacrificial anode divided by the flow rate in the system:

$$HRT = \text{Volume of anode } [m^3]/\text{Flow rate } [m^3/\text{hour}]$$

While typical HRT for embodiments of the present invention range from 6 seconds to 2 minutes, it has been shown that in the electrocoagulation process according to embodiments of the present invention, the removal efficiency of contaminants is strongly related to the saturated hydraulic conductivity, $K_{sat}$. The $K_{sat}$ value describes the ease with which a fluid can move through pore in a saturated pore structure.

Thus, the process according to an embodiment of the present invention may be performed under conditions so that a preferred interval for $K_{sat}$ is between 4 and 17.5 cm/day, preferably between 4.3 and 16.4 cm/day, most preferably between 7.6 and 13 cm/day.

In order to prevent dissolution of formed hydroxide flocs, pH of the process stream to be purified may be regulated before the process starts and/or during the process, preferably to a value between 5 and 8. In an embodiment wherein uranium is being removed from a process stream, the pH may be adjusted to a value of at least 10. The pH may be adjusted to facilitate removal of a specific contaminant.

Before and/or during the process an electrolyte may be added in order to increase the conductivity of the water to be treated.

EXAMPLES

The following examples intend to illustrate embodiments of the present invention but are not meant to limit the scope of the present invention.

Procedures Used for Determining Certain Properties

The data collected in the following examples consist of current (I), voltage (v), concentration of chromium (Cr), pressure (P), green strength (GS) and green density (GD). Values for each data set were obtained in accordance with the follow procedures.

Current and voltage were obtained from the display screen of the 5 A/30V DC power supply. The power supply was set to maintain a constant current for the desired test run where voltage could vary based on the resistance between the anode and cathode.

Influent samples were collected and filtered through a 0.45 micron syringe filter prior to analysis. Effluent samples were collected and set aside to allow the floc to settle. The supernate was then filtered through a 0.45 micron syringe filter. The filtered influent and effluent samples were analyzed for chromium(VI) concentration using a Hach DR5000 spectrophotometer (method 8023). The Method Detection Limit (MDL) of the spectrophotometer is 0.01 mg/L for Hexavalent Chromium [Cr(VI)]. In the examples, Cr(VI) concentration below the MDL is considered to have reached maximum contaminant removal and is defined as being non-detect.

Green strength is the amount of force the unsintered compacted anode can withstand. The anodes' green strength were tested according to ISO standard 3995. Green density is the density of the unsintered compacted anode and was calculated using the formula:

$$GD = Mm/V$$

Where Mm is the mass of the anode and V is the volume calculated using the volume of a cylinder equation ($V = \pi * r^2 * h$).

Example 1—Applied Current Per Unit Volume Treated

This example was performed using the apparatus illustrated in FIG. 1. Sacrificial anodes were produced from iron powder with an iron content of about 97%, apparent density of 1.39 g/cm$^3$ and specific surface area of 0.22 m$^2$/g. The particle size distribution of the iron powder contained 1% particles below 45 μm by weight. The amount of particles between 45 and 150 μm was 10% by weight. The amount of particles between 150 and 250 μm was 12% by weight. The amount of particles between 250 and 850 μm was 75.6% by weight. The amount of particles between 850 and 1000 μm was 1.4% by weight. Each permeable anode had a weight of 25 g and was pressed with a force of 27.6 MPa (2 TSI—ton per square inch) to achieve 62% porosity. Preferably, the anode is compressed with a force of at least 10 MPa, preferably at least 20 MPa, more preferably at least 25 MPa.

Potassium dichromate ($K_2Cr_2O_7$), hydrochloric acid (HCl) and sodium chloride (NaCl) were added to deionized water. The initial water quality consisted of a concentration of Cr(VI) 100 mg/L, pH equal to 7.0 and a conductivity of 2300 μS/cm. A peristaltic pump was used to deliver the wastewater under pressure to the reactor and through the anode in a continuous flow process. Tests were run at varying applied currents and the flow rates were adjusted in order to achieve effluent Cr(VI) concentrations below 0.01 mg/L. Table 1 shows the current and flow rate set-points in order to achieve maximum contaminant removal for this wastewater as well as the amount of current required per unit volume of wastewater treated.

TABLE 1

| Current (A) | Voltage (V) | Flow (ml/min) | I/Q (A/m$^3$/hr) |
|---|---|---|---|
| 0.4 | 5.1 | 14 | 476 |
| 0.6 | 7.2 | 23.5 | 426 |
| 0.9 | 8.6 | 46 | 326 |
| 1.8 | 10.2 | 92 | 326 |

The results in table 1 show that a permeable electrode functions more efficiently at increased flow rates and would be most suited for high flow applications with relatively high levels of contaminant.

A second test in this example was conducted using the same style of electrode but in a conventional electrocoagulation process. The electrodes were suspended from a buss bar assembly into a reaction vessel. The process was run in a batch situation. The results of the conventional electrocoagulation process are compared to those of the permeable anode process in table 2.

As a comparison example electrocoagulation of the same water as used in the previous experiment in the process according to an embodiment of the present invention but performed in a conventional process where the water to be treated was not forced through the permeable anode. The apparatus for the conventional electrocoagulation process included a 1,200 ml glass beaker, magnetic stirrer, electrode assembly holder and power supply. The powder metal electrodes were produced in a manner to achieve identical mass and porosity as the permeable electrode used in the process according to an embodiment of the present invention.

TABLE 2

| Technology | Current (A) | Voltage (V) | Flow (ml/min) | I/Q (A/m$^3$/hr) | Power (kW/m$^3$/hr) |
|---|---|---|---|---|---|
| Permeable Electrocoagulation | 0.9 | 8.6 | 46 | 326 | 2.80 |
| Conventional Electrocoagulation | 0.9 | 8.0 | 37 | 405 | 3.24 |

The permeable reactor was able to achieve maximum contaminant removal of 100 mg/L chromium with an applied current of 0.9 A at a rate of 46 ml/min. The conventional reactor having electrodes with the same surface area, same applied current and same initial contaminant concentration was only able to treat at a rate of 37 ml/min.

In addition to increased removal efficiency, the permeable reactor required less power consumption to treat the same volume. In order for a conventional reactor to treat the same volume (46 ml/min) of wastewater an applied current of 1.1 A would be required. The permeable reactor and conventional reactor required a power consumption of 2.80 and 3.24 kW/m$^3$/hr respectively.

The power consumption in kWhr per unit volume of water treated is expressed as:

$$P=(I*V)/(1000*Q),$$

where Q is the flow rate in m³/hr, I is the currant in A and V is the voltage.

Example 2—Amount of Contaminant Removed Per Unit Mass of Flocculant Generated

Two separate test apparatuses were used for this experiment. The apparatus for the permeable electrocoagulation process was performed using the apparatus illustrated in FIG. 1. Sacrificial anodes were produced according to the same specifications defined in example 1. The apparatus for the conventional powder metal electrocoagulation process included a 1,200 ml glass beaker, magnetic stirrer, electrode assembly holder and power supply. The powder metal electrodes were produced in a manner to achieve identical mass and porosity as the electrodes according to an embodiment of the invention.

Potassium dichromate ($K_2Cr_2O_7$), hydrochloric acid (HCl) and sodium chloride (NaCl) were added to deionized water. The initial water quality consisted of a concentration of Cr(VI) 100 mg/l, pH equal to 7.0 and a conductivity of 2300 µS/cm. Each test was run with the same volume of wastewater prepared. The applied currents were chosen for each test in order to effectively treat the same volume of wastewater in the same amount of time. Table 3 shows the operating conditions and results as they pertain to mass of contaminant removed per unit mass of flocculant generated. Each test was run in triplicates. The results reported in table 3 are the average of the triplicated testing.

TABLE 3

| Operating conditions/results | Process according to an embodiment of the invention | Conventional Process |
|---|---|---|
| Mass of electrode | 25 g | 25 g |
| Porosity of Electrode | 62% | 62% |
| Current | 0.9 A | 1.0 A |
| Volume treated | 1,200 ml | 1,200 ml |
| Runtime | 30 min | 30 min |
| Initial concentration of Cr(VI) | 100 mg/l | 100 mg/l |
| Total Cr(VI) removed | 0.12 g | 0.12 g |
| Total flocculant produced | 1.38 g | 1.51 g |

Figure 4:
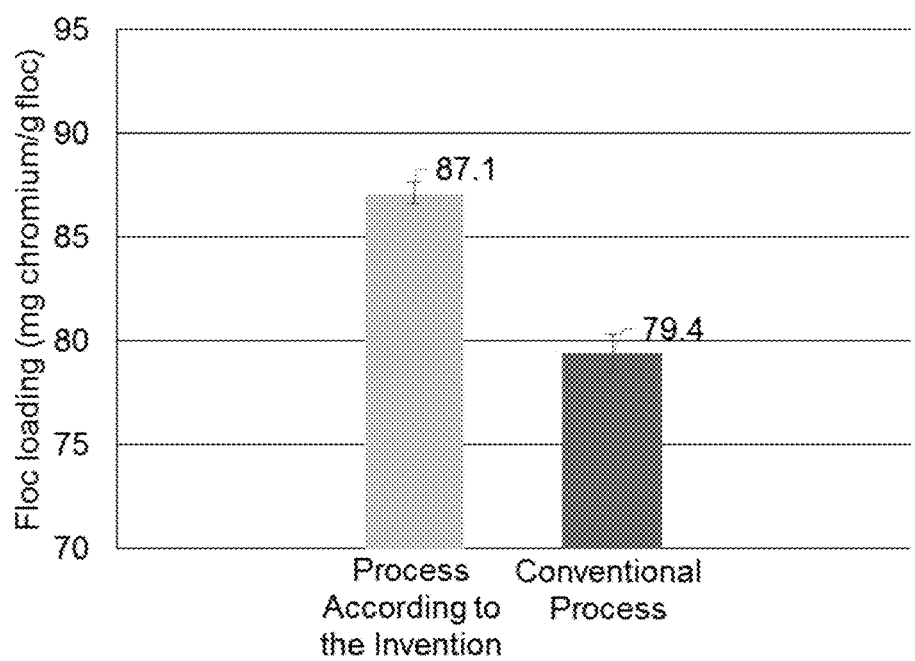
FIG. 4 is a diagram showing mass of Cr(VI) removed per unit mass of flocculant produced. Comparing conventional electrocoagulation process with permeable electrode process.
Figure 5:
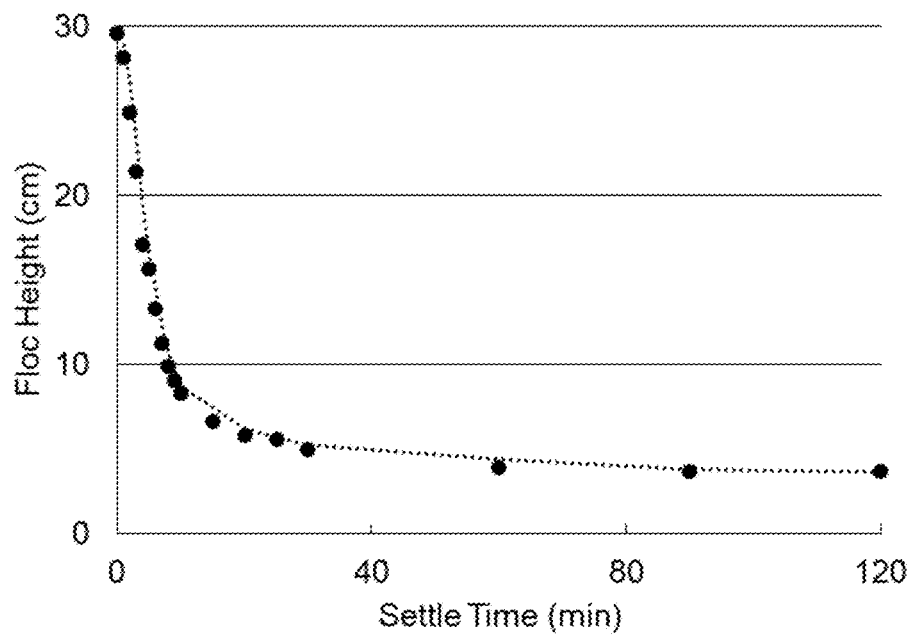
FIG. 5 is a diagram showing settling velocity of flocculant generated by permeable electrode in a process according to an embodiment of the present invention according to Example 2.
Figure 6:
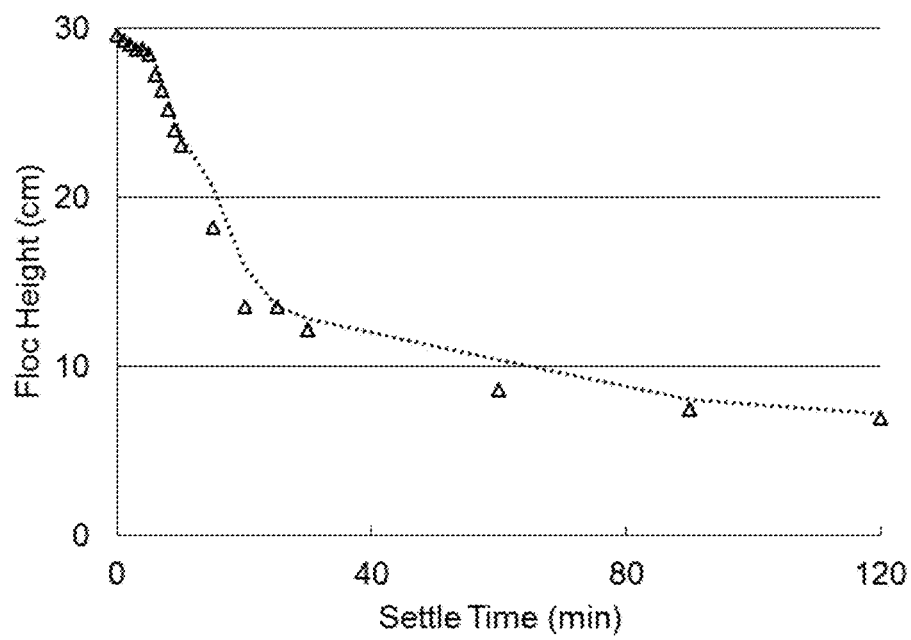
FIG. 6 is a diagram showing settling velocity of flocculant generated by electrode in the conventional process in Example 2.

FIG. 4 shows concentration of removed Cr in the dried flocculant produced for the two processes. The concentration of removed Cr in the floc produced according to an embodiment of the present invention is higher compared to the concentration of Cr in the floc produced according the conventional process.

In order to achieve the same amount of contaminant removal from the same volume of water in the same amount of time the conventional process required a higher applied current (1.0 A) in comparison to the process according to an embodiment of the present invention (0.9 A). Due to the lower required current needed in the process according to an embodiment of the present invention, less flocculant was generated for maximum removal of hexavalent chromium. As a result, the permeable electrocoagulation process according to an embodiment of the present invention removed 9.7% greater quantity of contaminant per unit mass of flocculant (87.1 mg Cr(VI)/g of flocculant) than that of the conventional electrocoagulation process (79.4 mg Cr(VI)/g of flocculant).

Settling velocity of the flocs from the permeable electrode and conventional electrode were evaluated by analyzing the compressed volume over time in a graduated settling column at room temperature. Readings at certain times of the height of the settled floc were taken, i.e. at the interface of floc and water.

Calculated using a type III hindered zone settling velocity plot, the process according to an embodiment of the present invention cause a settling velocity of 0.917 m/h whereas the conventional process causes a settling velocity of 0.385 m/h respectively. The floc produced by a process according to an embodiment of the present invention settles 2.4 times faster than floc produced conventionally.

Example 3—Contaminant Removal Rate as a Function of $K_{sat}$ Value

This example was performed using the apparatus illustrated in FIG. 1. Sacrificial anodes were produced from iron powder having the same properties as the iron powder define in example 1. Table 4 shows the characteristics of the anodes produced for this example.

TABLE 4

| Pressing Force [MPa (TSI)] | Mass [g] | Diameter [cm (in)] | Thickness [cm (in)] | Porosity (%) | Green Strength [MPa (PSI)] |
|---|---|---|---|---|---|
| 27.6 (2) | 20 | 3.18 (1.25) | 0.84 (0.33) | 61% | 1.77 (257) |
| 27.6 (2) | 25 | 3.18 (1.25) | 1.04 (0.41) | 61% | 1.77 (257) |
| 27.6 (2) | 30 | 3.18 (1.25) | 1.27 (0.50) | 61% | 1.77 (257) |
| 41.4 (3) | 20 | 3.18 (1.25) | 0.76 (0.30) | 57% | 4.31 (625) |
| 41.4 (3) | 25 | 3.18 (1.25) | 0.94 (0.37) | 57% | 4.31 (625) |
| 41.4 (3) | 30 | 3.18 (1.25) | 1.14 (0.45) | 57% | 4.31 (625) |
| 55.2 (4) | 20 | 3.18 (1.25) | 0.69 (0.27) | 53% | 5.83 (846) |
| 55.2 (4) | 25 | 3.18 (1.25) | 0.86 (0.34) | 53% | 5.83 (846) |
| 55.2 (4) | 30 | 3.18 (1.25) | 1.04 (0.41) | 53% | 5.83 (846) |

Figure 7:
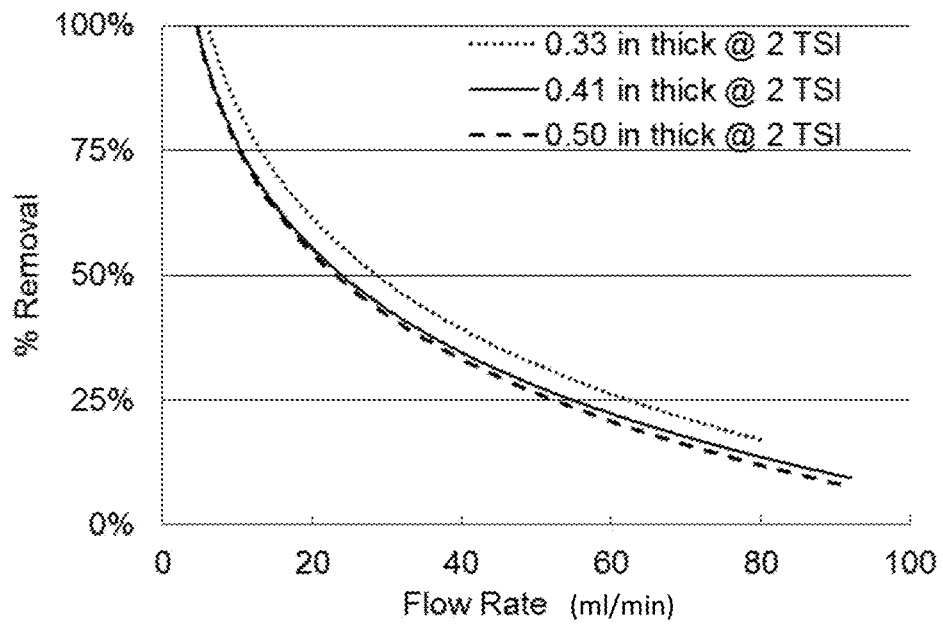
FIG. 7 is a diagram showing removal efficiency comparison for permeable anodes pressed with the same pressing force and to the same porosity (27.6 MPa (2 TSI) and 61%, respectively) at different thicknesses of 0.33, 0.41 and 0.50 in thick; the anodes may be used in an embodiment of the electrocoagulation process according to the present invention.
Figure 8:
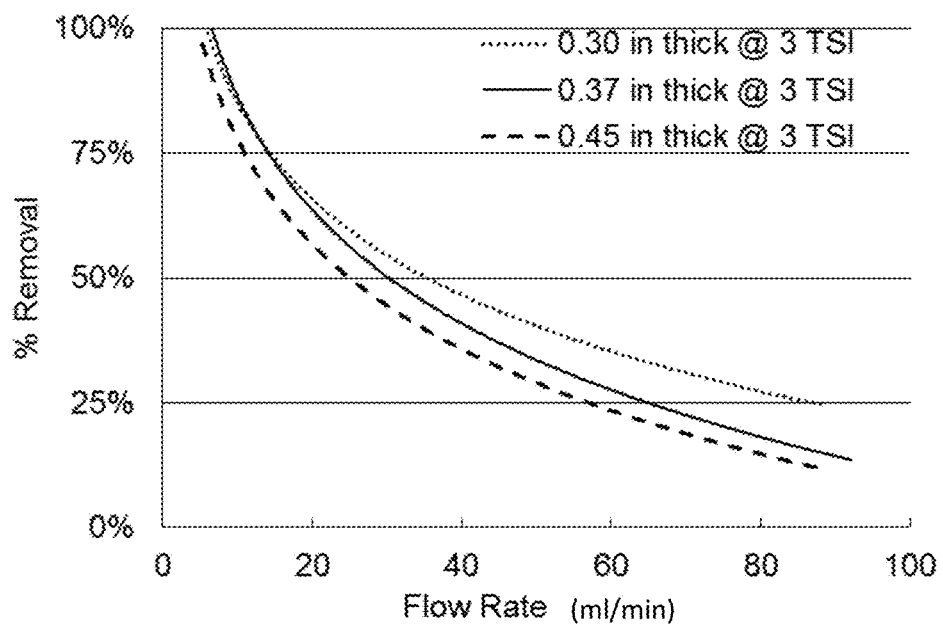
FIG. 8 is a diagram showing removal efficiency comparison for permeable anodes pressed with the same pressing force and to the same porosity (41.4 MPa (3 TSI) and 57%, respectively) at different thicknesses of 0.30, 0.37 and 0.56 in thick; the anodes may be used in an embodiment of the electrocoagulation process according to the present invention.
Figure 9:
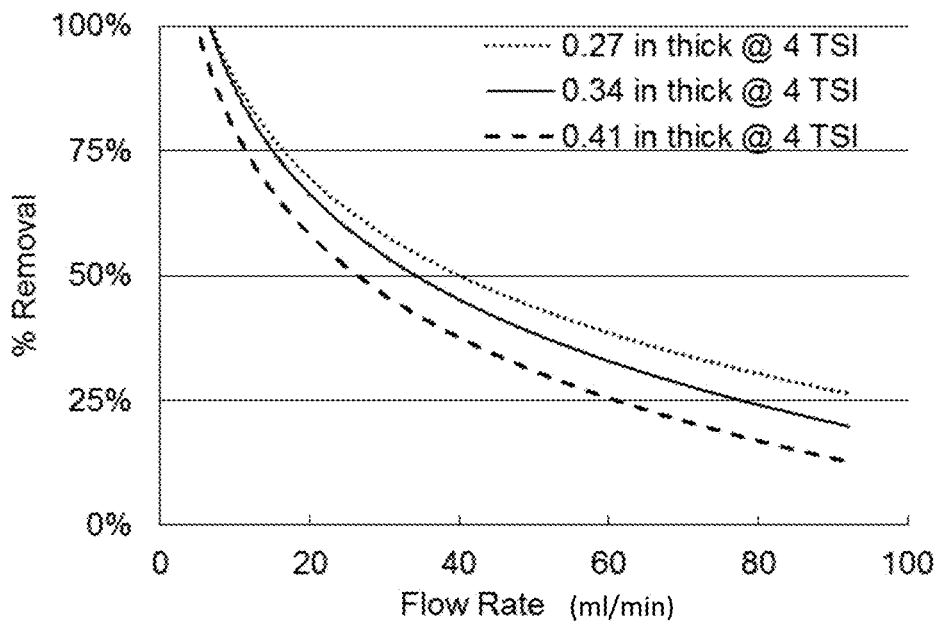
FIG. 9 is a diagram showing removal efficiency comparison for permeable anodes pressed with the same pressing force and to the same porosity (55.2 MPa (4 TSI) and 53%, respectively) at different thicknesses of 0.27, 0.34 and 0.41 in thick; the anodes may be used in an embodiment of the electrocoagulation process according to the present invention.

Process description: Potassium dichromate (K2Cr2O7), hydrochloric acid (HCl) and sodium chloride (NaCl) were added to deionized water. The initial water quality consisted of a concentration of Cr(VI) 100 mg/L, pH equal to 7.0 and a conductivity of 2300 µS/cm. All tests were conducted with an applied current of 0.2 A. Flow rates of 4.5, 9, 23.5, 46 and 92 ml/min were applied through the permeable anode. The effluent was collected to measure % removal of hexavalent chromium at applied flow condition. Removal efficiency curves in FIGS. 7 through 9 show the removal of chromium for the permeable anodes pressed with the same pressing force and comparing electrode thickness. FIG. 7 represents the data collected for anodes pressed at 27.6 MPa (2 TSI) (61% porous), FIG. 8 at 41.4 MPa (3 TSI) (57% porous) and FIG. 9 at 55.2 MPa (4 TSI) (53% porous).

Interestingly, the results reported in all 3 figures show that at a constant pressing force, maintaining a constant porosity, removal efficiency is greater through thinner permeable anodes.

Removal efficiency in the examples is defined as the % removal over time:

$$\text{Removal Efficiency}=(C_0-C_F)/C_0*100/T$$

Where $C_0$ is the initial concentration, $C_F$ the resulting concentration and T as time.

Figure 10:
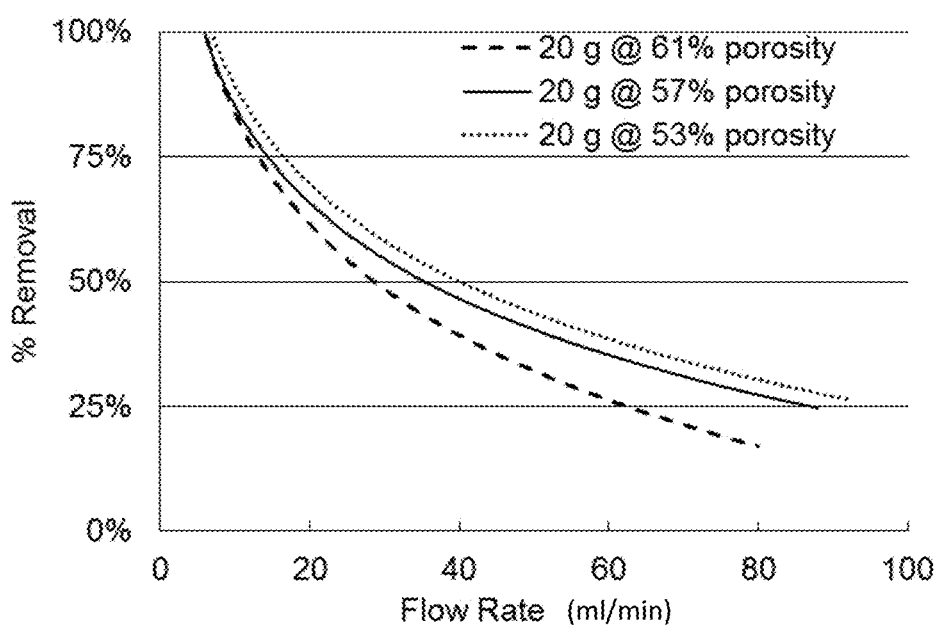
FIG. 10 is a diagram showing removal efficiency comparison for permeable anodes having the same mass (20 g) with varying porosity of 61%, 57% and 53%; the anodes may be used in an embodiment of the electrocoagulation process according to the present invention.
Figure 11:
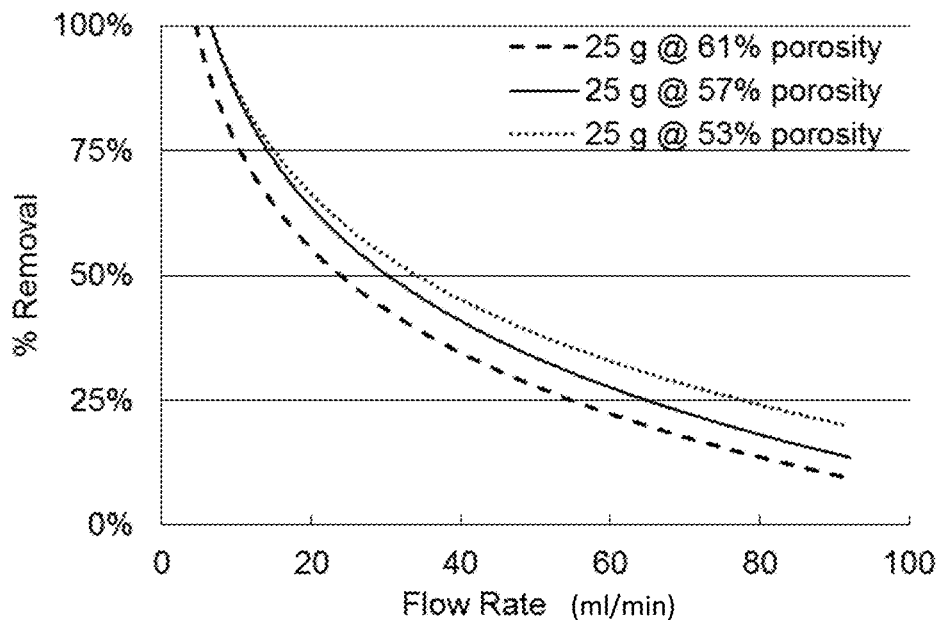
FIG. 11 is a diagram showing removal efficiency comparison for permeable anodes having the same mass (25 g) with varying porosity of 61%, 57% and 53%; the anodes may be used in an embodiment of the electrocoagulation process according to the present invention.
Figure 12:
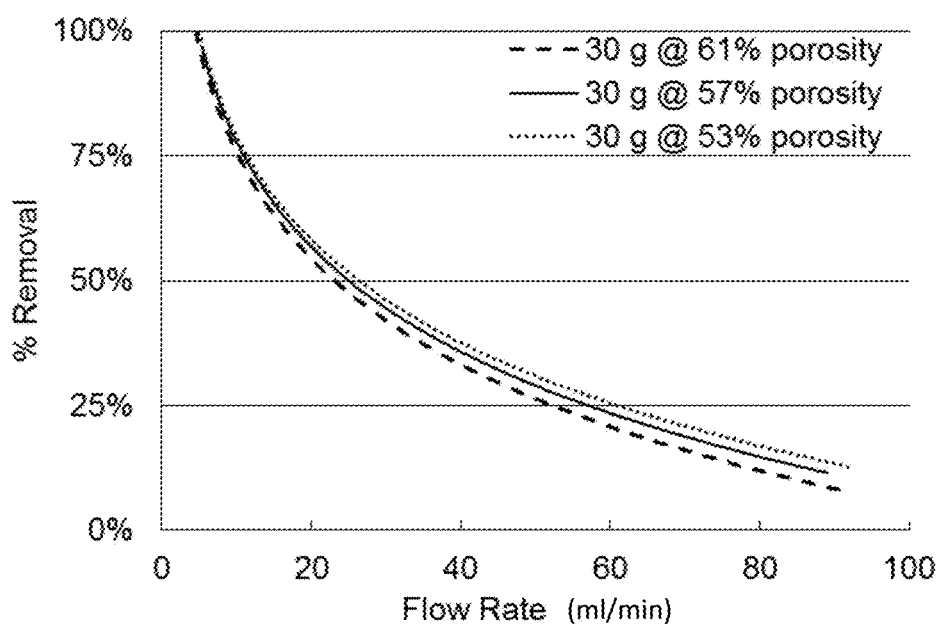
FIG. 12 is a diagram showing removal efficiency comparison for permeable anodes having the same mass (30 g) with varying porosity of 61%, 57% and 53% the anodes may be used in an embodiment of the electrocoagulation process according to the present invention.

FIGS. 10 through 12 show the removal of chromium for the permeable anodes having the same mass but pressed with various pressing forces giving each electrode a different porosity. FIG. 10 represents the data collected for anodes pressed having a mass of 20 g, FIG. 11 with 25 g and FIG. 12 with 30 g.

Surprisingly, the results reported in all 3 figures (FIG. 10 through 12) show that at a constant anode mass removal efficiency is inversely proportional to porosity. Before conducting the experiment it was hypothesized that the more porous anodes would perform better due to higher internal surface area.

Considering the surprising results regarding the increased contaminant removal with both thinner and less porous permeable anodes more attention was given to investigate the reason. One theory may be drawn that the flux could have a direct effect on removal efficiency at a constant applied current. In this example the flux was defined using the saturated hydraulic conductivity (Ksat) of the permeable electrodes.

The $K_{sat}$ value is expressed as the proportionality factor in Darcy's Law.

$$Q = K*A*(\Delta H/\Delta L)$$

Where Q is the flow rate, A is the cross sectional area of the anode, ΔH is the hydraulic head and ΔL the thickness of the anode.

Figure 13:
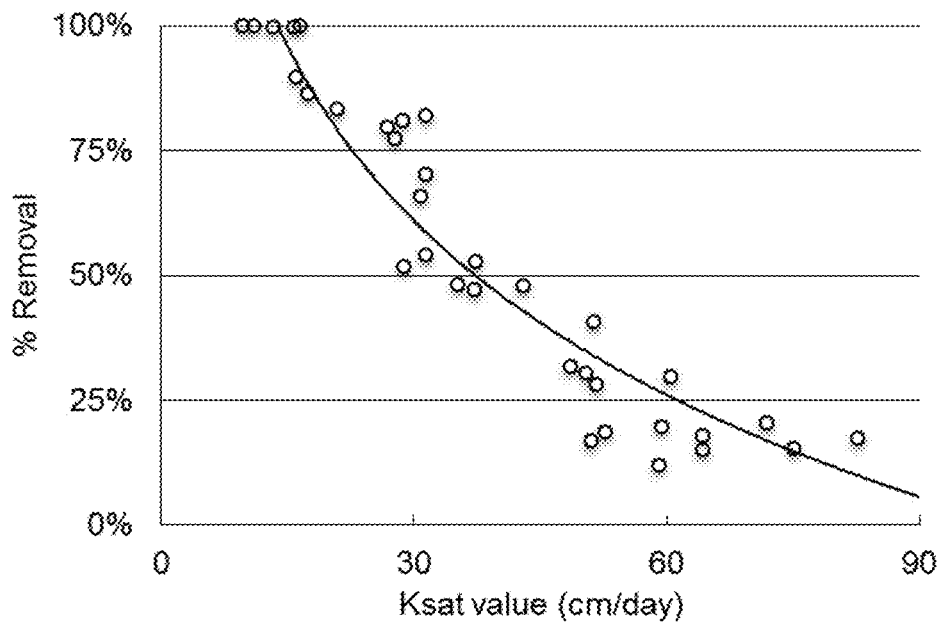
FIG. 13 is a diagram showing $K_{sat}$ value in respect to removal efficiency.

FIG. 13 shows Cr(VI) removal as it is related to the $K_{sat}$ value of the permeable anode. The data shown here is the complete data set matrix as defined in Table 4 and the process description.

The results represented in FIG. 13 confirm the direct correlation the $K_{sat}$ value has on removal efficiency of a permeable electrode. As the $K_{sat}$ value increases for a constant current applied to the anodes, removal efficiency decreases. Since flow rate has a large impact on $K_{sat}$ FIG. 13 is broken up into constant flow rate trends and is represented in FIG. 14.

Figure 14:
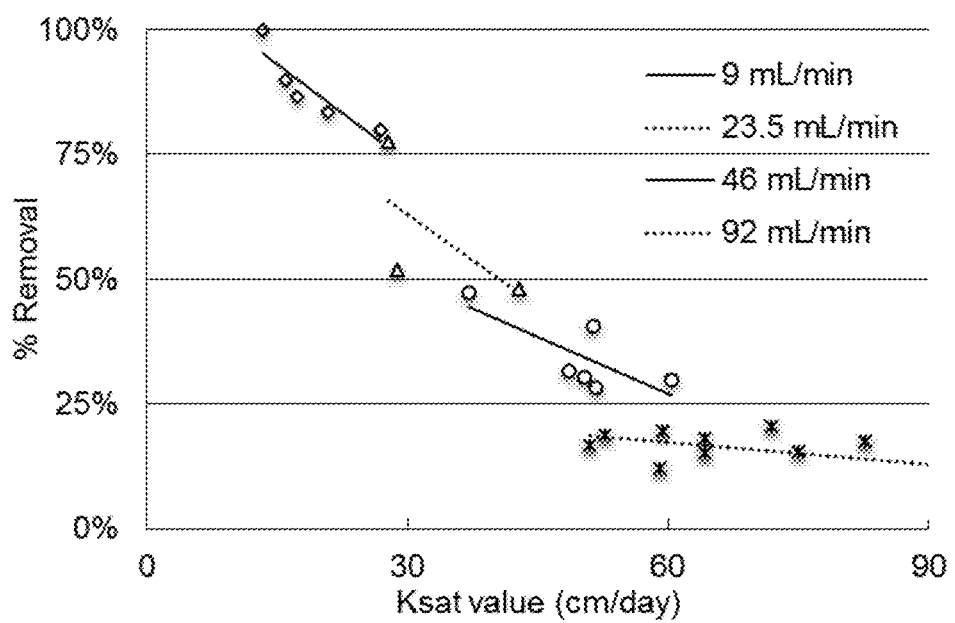
FIG. 14 is a diagram showing $K_{sat}$ value for various flow rates.

FIG. 14 confirms that the removal efficiency is inversely proportional to $K_{sat}$ even at constant flow rates.

Figure 15:
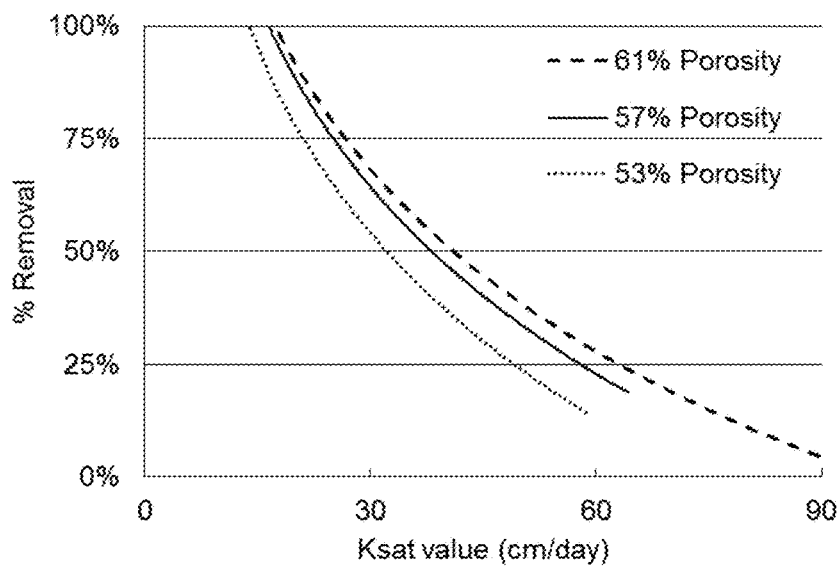
FIG. 15 is a diagram showing $K_{sat}$ value for various anode porosities.
Figure 16:
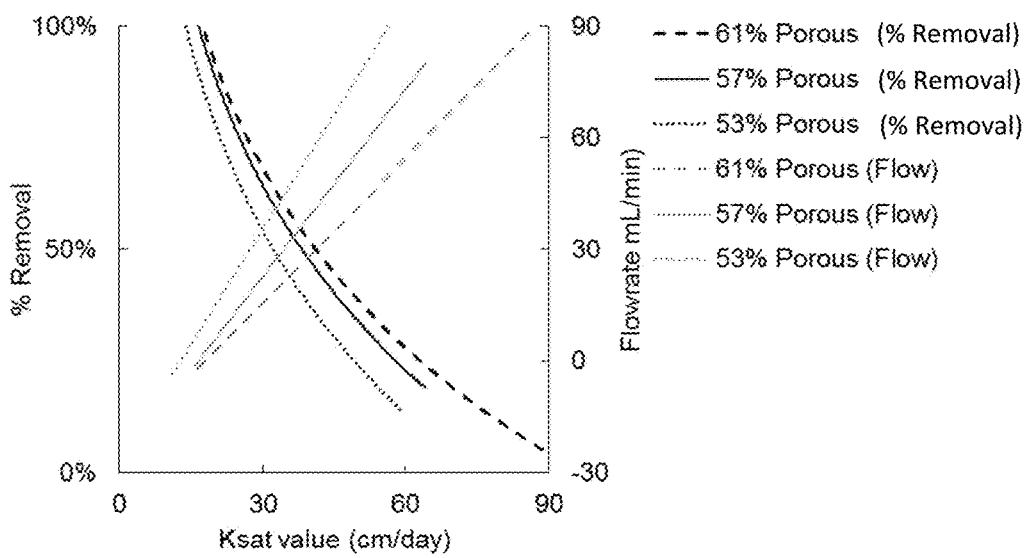
FIG. 16 is a diagram showing $K_{sat}$ value for various anode porosities and flow rate.

FIG. 15 shows the trend $K_{sat}$ value has on removal efficiency at different anode porosities. As expected the more porous anodes achieve higher removal efficiency at a given $K_{sat}$ value. This is further explained in FIG. 16 where the flow rate versus $K_{sat}$ is transposed on the same data as FIG. 15.

Given Darcy's Law as $K=(Q/A)*(\Delta L/\Delta H)$, at a constant $K_{sat}$ value comparing 2 anodes (anode 1 and anode 2) with the same cross sectional area results in:

$$Q1 \times \Delta L1/\Delta H1 = Q2 \times L2/\Delta H2$$

If anode 1 has a lower porosity than anode 2, then ΔL1<ΔL2 and ΔH1>ΔH2. Therefore, anode 1 requires a higher flow rate in order to maintain the same $K_{sat}$ value. Thus reducing its removal efficiency due to reduced contact time (i.e. reduced hydraulic retention time) through the reactor.

Expanding on this example, sacrificial anodes were produced from iron powder having the same properties as the iron powder used in the early parts of example 3. The anodes consisted of the same mass and surface area but slightly different thicknesses. Varying pressing forces, which can be found in Table 5, were used to produce anodes of different porosities ranging from 12.6% to 62.1%.

Figure 20:
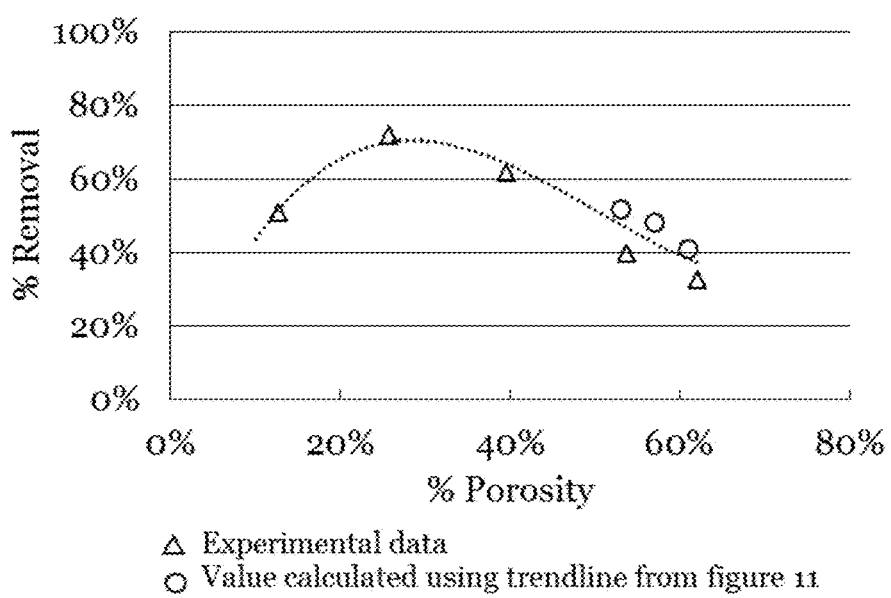
FIG. 20 shows a plot of the percent removal for permeable anodes having varying porosity.

The example maintained constant process parameters for all anode testing. Specifically, flow rate set at 46 ml/min and applied current was 0.2 A. The results are reported in FIG. 20. For comparison, the trend line fitted in FIG. 20 includes three data points calculated from results reported in FIG. 11. The experimental data in FIG. 11 was generated using anodes of the same mass used here as well as tested using an applied current of 0.2 A. The calculation was performed to correct for the difference in flowrate. The additional three data points were generated using a flow rate of 46 ml/min. FIG. 20 was used to define the zones related to removal efficiency in Table 7.

Example 4—Green Strength Versus Porosity

This example was performed using the apparatus illustrated in FIG. 1. Anodes were produced from iron powder with an iron content of about 97%. Anodes were produced at varying porosities and were tested for their permeability. Table 5 shows the characteristics of each anode and the permeability (flow in ml/min) with an applied system pressure of 34.5 kPa (5 psi).

TABLE 5

| Pressing Force [MPa (TSI)] | Green Density [g/cm³] | % Porosity | Green Strength [MPa (psi)] | Flow Rate [ml/min] |
|---|---|---|---|---|
| 27.6 (2.0) | 2.99 | 62.1% | 1.77 (257) | 154 |
| 55.2 (4.0) | 3.64 | 53.7% | 5.83 (846) | 108 |
| 137.9 (10.0) | 4.76 | 39.5% | 16.68 (2,419) | 50 |
| 344.8 (25.0) | 5.85 | 25.7% | 36.93 (5,356) | 9 |
| 827.4 (60.0) | 6.88 | 12.6% | 83.89 (12,167) | 3 |
| 986.0 (71.5) | 7.08 | 10.0% | 99.44 (14,422) | 0 |

From the data reported in table 5, an anode with a porosity of 10% or less does not permit the flow of water through it material and is considered non-permeable. As the porosity increases the green strength of the anode decreases. At a green strength less than 1.72 MPa (250 psi) the integrity of the anode would not be able to withstand shipping and handling, installation, maintenance or applied system process conditions. Therefore, the permeable anodes should have a porosity no less than 11% and not greater than 62%

Example 5—Anodes Produced from Different Materials

In a separate example, anodes were produced of different iron materials to compare the green strength at the same pressing force. A preferred permeable iron composite used to produce the permeable anodes was compared to anodes produced from other iron powders (less preferred iron powders "iron A" through "Iron D"). All materials were pressed with a pressing force of 689 MPa (50 TSI) and the results are reported in table 6.

TABLE 6

| | Anode Material | | | | |
|---|---|---|---|---|---|
| | According to a preferred embodiment of the Invention | Iron A Anode | Iron B Anode | Iron C Anode | Iron D Anode |
| AD [g/cm³] | 1.39 | 3.01 | 2.96 | 3.0 | 3.0 |
| Particles +500 µm | 3.9% | 0.2% | 0% | 0% | 0% |
| Particles +212 µm | 77% | 27.7% | 0% | 0% | 0% |
| Particles +150 µm | 96.4% | 95.9% | 7.1% | 11.7% | 12% |
| Particles | 100% | 99.8% | 73.4% | 81.5% | 84.5% |

TABLE 6-continued

| | Anode Material | | | | |
|---|---|---|---|---|---|
| | According to a preferred embodiment of the Invention | Iron A Anode | Iron B Anode | Iron C Anode | Iron D Anode |
| +45 μm Particles −45 μm | 0% | 0.2% | 26.6% | 18.5% | 15.5% |
| Green Density [g/cm³] | 6.66 | 6.95 | 6.82 | 6.73 | 6.75 |
| % Porosity | 15.4% | 11.7% | 13.4% | 14.5% | 14.3% |
| Green Strength [MPa (psi)] | 67.64 (9811) | 15.26 (2214) | 8.53 (1237) | 13.27 (1920) | 11.91 (1727) |

The iron particles used to produce the permeable anodes used in a preferred embodiment of the present invention, not only result in a slightly higher porosity but yield an anode having a significantly higher green density than anodes made from the other iron powders.

Figure 17:
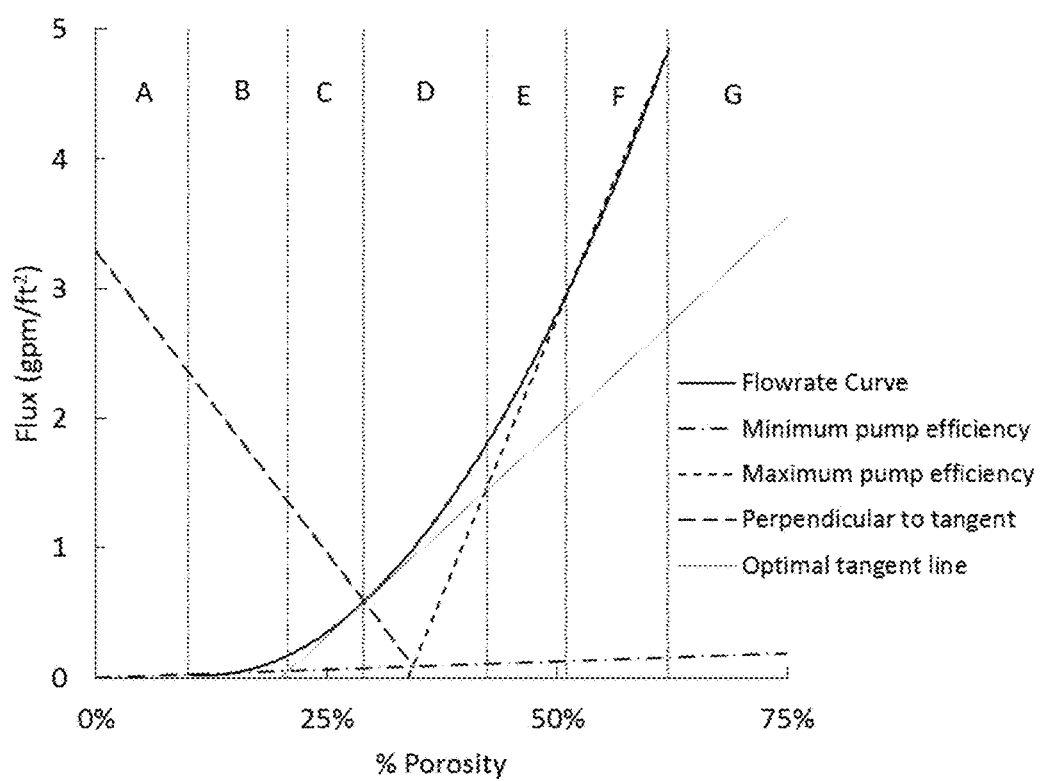
FIG. 17 is a diagram showing a plot of flux through a permeable anode at various porosities.

The optimal porosity range for the permeable anodes is determined using FIG. 17. In this figure a flux curve is plotted for the anodes possessing different porosities from table 5. Flux is the amount of flow rate per cross-sectional area of the anode. All flux values were gathered with an applied pressure of 34.5 kPa (5 psi) through the anodes. To determine the porosity of an anode which will give you optimal operating performance first linear lines are extended from both the steepest (maximum pump efficiency) and most flat (minimum pump efficiency) portions of the flux curve. Where these two lines intersect, another line (perpendicular to tangent) is drawn with a slop which is perpendicular to a line (optimal tangent line) tangent to the flux curve. Using this plot (FIG. 17), zones A through G are summarized and defined in table 7.

TABLE 7

Optimal % porosity ranges based on anode performance in regards to effective removal, flux and integrity.

| Zone | % Porosity Range | Removal Efficiency | Pump Efficiency | Green Strength |
|---|---|---|---|---|
| A (Non-permeable zone) | 0-10% | N/A* | N/A* | Excellent |
| B (Low pump efficiency zone) | 11-21% | Good | Poor | Excellent |
| C (Plug flow zone) | 22-29% | Excellent | Fair | Good |
| D (Optimal performance zone) | 30-42% | Excellent | Good | Good |
| E (Low resistivity zone) | 43-51% | Good | Good | Fair |
| F (High pump efficiency zone) | 52-62% | Fair | Excellent | Fair |
| G (Low green strength zone) | 63-100% | Poor | Excellent | Poor |

*N/A: Data unattainable due to no flow. Electrodes are non-permeable below 10% porosity.

The preferred and optimal zones in Table 7 and FIG. 17 were determined based on a combination of the removal efficiency, flux and anode integrity.

The removal efficiency comparison of anodes of different porosities but having the same mass and area as well as operated at constant process parameters can be found in FIG. 20. The optimal porosity range for removal efficiency in this example is between 22% and 42%. Conducting this example at a different flow rate, while maintaining all other operating parameters constant, will result in a vertical shift of the plot. However, the optimal removal efficiency range maintains consistency with the findings reported in example 3.

The flux can be correlated to a pump efficiency which is represented in FIG. 17 as flux curve and the optimal range defined in Table 7. Pump efficiency is the ratio of the power imparted on the fluid by the pump in relation to the power supplied to drive the pump. Efficiency is a function of the discharge and therefore also operating head. In the first part of example 3, anodes of varying porosities were subjected to different flowrates while maintaining a constant pressure. When maintaining a constant pressure, anode porosity and flowrate are directly proportional. Specifically, anodes of a higher porosity result in higher discharge at a constant pressure, thus requiring an equal amount of horsepower from the pump. Therefore, anodes of higher porosity result in greater efficiency of the process pump.

The anodes used in the various examples have not been sintered. Accordingly, the integrity of an anode is represented here by its green strength. The green strength of anodes at various porosities can be found in Table 5 and the optimal range defined in Table 7. An anode's porosity is inversely proportional to green strength. Therefore, the integrity of an anode weakens with increased porosity.

An anode with a porosity of 10% or less allows no flow when a water pressure of 34.5 kPa (5 psi) is applied. This is defined as the non-permeable zone (zone A).

Zone B includes anodes with very high green strength but reduced overall system efficiency due to a high required pump output. This zone is defined by the permeable threshold (10% porosity) and where the optimal tangent line intersects the minimum pump efficiency line (21% porosity). Due to the reduced interconnecting porosity in this zone, there is channelized flow through the electrode.

The porosity in zone C (plug flow zone) is where the interconnecting porosity starts to promote plug flow through the anode. The range for this zone is determined by the upper range of zone B and the % porosity value in which the tangent line meets the flux curve. This point is also the lower limit to the optimal performance zone (zone D). The upper limit to the optimal performance zone is determined by the intersecting point of the optimal tangent line and the maximum pump efficiency line. This zone is where the combination of effective removal, flux and anode integrity is at the maximum and ranges from 30%-42% porosity.

Zone E has a range from 43%-51%. The upper limit of this zone is the point at which resistance through the anode is significantly reduced compared to the more porous anodes and is determined by the point where the maximum pump efficiency line breaks off of the flux curve.

The final defined range in terms of porosity for a permeable anode is the 52%-62% range (zone F). In the zone the pump performance is most favorable. However, the reactive performance of the anode is reduced, as is the integrity. There is the potential for the anode to degrade faster in the high pump efficiency zone. Beyond 62% porosity the anodes green strength is too low to be subjected to shipping, handling and applied system processes.

The permeable anode should have a porosity of 11-62%, preferably between 22-51%, and most preferably between 30-42%. In the range 22-51% good to excellent removal efficiency is obtained with at least fair pump efficiency and an at least fair green strength. In the range 30-42% excellent removal efficiency is obtained with good pump efficiency and good green strength. The optimal Ksat values for these corresponding porosity ranges can be found in FIGS. 18A-B. Thus, the process according to an embodiment of the present invention may be performed under conditions so that a preferred interval for $K_{sat}$ is between 4.3 and 16.4 cm/day, most preferably between 7.6 and 13 cm/day.

Figure 18A:
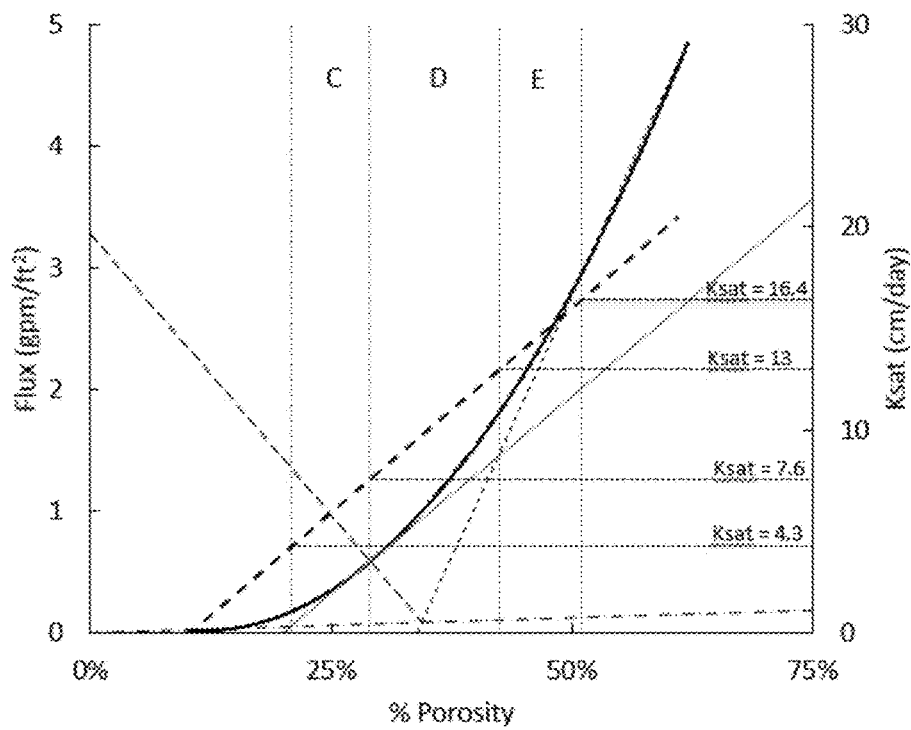
FIGS. 18A-B are diagrams showing the linear relationship of $K_{sat}$ vs. porosity transposed on the flux plot shown in FIG. 17.
Figure 18B:
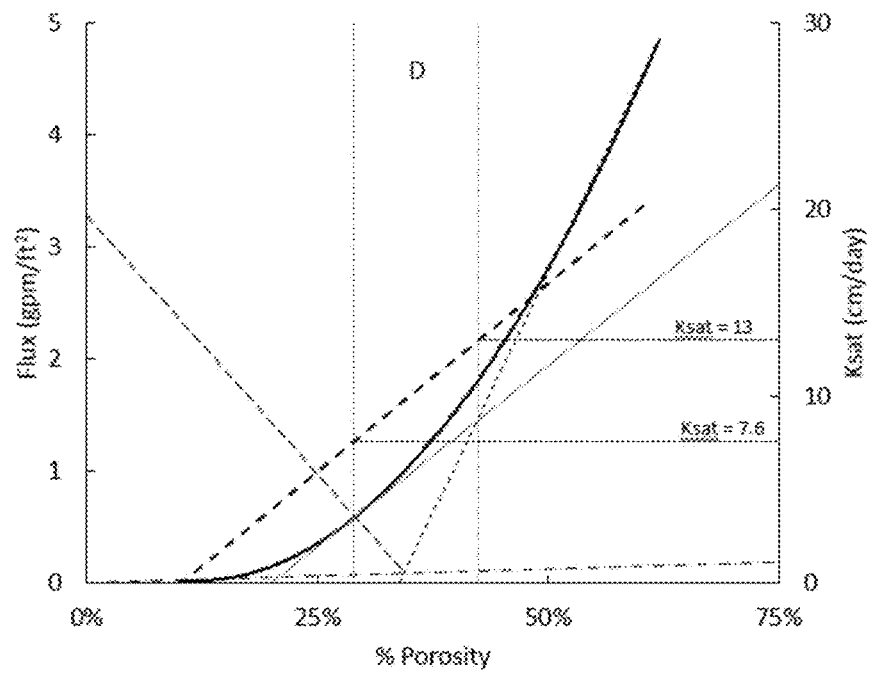
Figure 19:
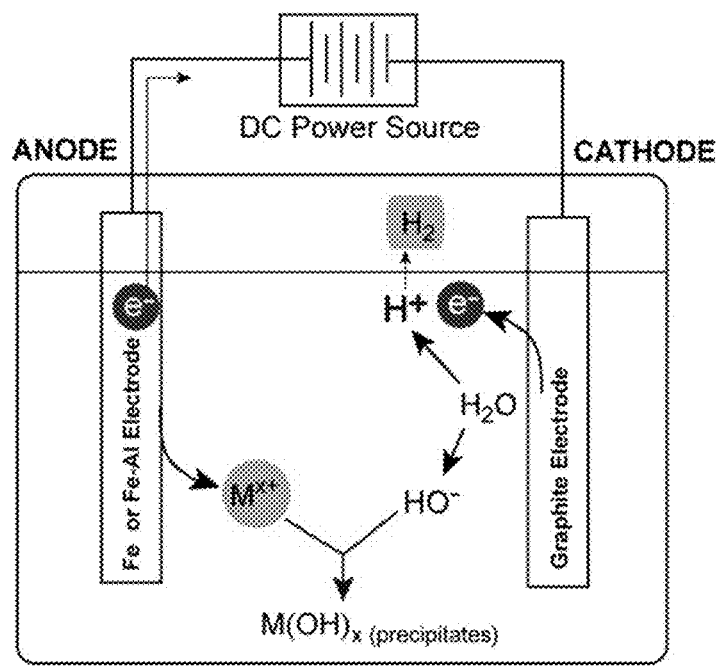
FIG. 19 shows a principal drawing of a conventional electrocoagulation process.

If the $K_{sat}$ value line is transposed on the flux curve at various porosities, the preferred $K_{sat}$ range can be defined as shown in FIG. 18A and the optimal $K_{sat}$ range can be defined as shown in FIG. 18B. Using the porosity range of 30-42% from zone D (optimal performance zone) in table 7, the $K_{sat}$ values for anodes with this porosity range is between 7.6-13 cm/day.

EMBODIMENTS

1. An electrocoagulation device configured to treat a process stream, the device comprising:
   a cathode;
   a sacrificial anode consisting of a compacted powder comprising iron and having a porosity between 11 and 62% by volume, wherein said anode is porous and water permeable;
   a pressure system, wherein the pressure system is configured for the process stream to flow through said anode,
   wherein said anode has a first side and an opposite second side, wherein the process stream flows from the first side through said anode to the second side,
   wherein a pressure of the process stream on the second side is less than the pressure on the first side, such that a pressure differential is at least 6.9 kPa (1 psi), preferably at least 17.9 kPa (2.6 psi).

2. The device according to embodiment 1, wherein the pressure system is configured such that at least 50 wt %, preferably 80 wt %, more preferably 95 wt %, and most preferably at least 99.5 wt %, of the process stream flows through said anode.

3. The device of embodiment 1 or 2, wherein the pressure of the process stream on the first side is at least 13.8 kPa (2 psi).

4. The device according to any of embodiments 1-3, wherein said anode has a porosity between 22-51% by volume, preferably between 30-42% by volume.

5. The device according to any one of the preceding embodiments, wherein said anode consists of compacted and sintered powder.

6. The device according to any of embodiments 1-5, wherein the compacted powder comprises at least 90% by weight of iron, preferably at least 95% by weight of iron and most preferably at least 97% by weight of iron.

7. The device according to any of embodiments 1-6, wherein the compacted powder comprises iron powder having a particle size distribution such that the amount of particles below 45 μm being at most 10% by weight, between 45 and 150 μm being 0-20% by weight, between 150 and 212 μm being 10-50% by weight, between 212 and 500 μm being 50-90% by weight and above 500 μm being 0-30% by weight.

8. The device according to embodiment 7, wherein said iron powder has a particle size distribution such that amount of particles below 45 μm being at most 5% by weight, between 45 and 150 μm being 0-20% by weight, between 150 and 212 μm 10-30% by weight, between 212 and 500 μm being 60-90% by weight and above 500 μm being 0-10% by weight.

9. The device according to any of embodiments 1-8, wherein said compacted powder comprises a mixture of compacted iron powder and aluminum powder.

10. The device according to embodiment 9, wherein the weight ratio between iron powder and aluminum powder 50:50 to 98:2, preferably 60:40 to 98:2, and most preferably 70:30 to 95:5.

11. A process for treating a process stream by electrocoagulation containing the following steps:
    providing a device according to any of embodiments 1-10,
    passing the process stream through the device by pressurizing the process stream before passing through said anode, while supplying an electric potential difference between said anode and said cathode.

12. A process according to embodiment 11, wherein when said anode and cathode are identical in structure, the process further comprises the step of:
    switching polarity when a sacrificial part of said anode at least partly is consumed.

13. A process according to any of embodiments 11-12, wherein the process stream is pressurized above atmospheric pressure before passing through said anode.

14. A process according to any of embodiments 11-13, wherein said anode has a saturated hydraulic conductivity (Ksat) value of above 0 and up to 19 cm/day, preferably between 4 and 17.5 cm/day, more preferably between 4.3 and 16.4 cm/day and most preferably between 7.6 and 13 cm/day.

15. A process according to any of embodiments 11-14, wherein the process further comprises, prior to, and/or during the process of passing the process stream through the device, adjusting pH to a value which prohibits dissolution of formed hydroxide flocculants, preferably to a value between 5 and 8.

16. A method according to any of embodiments 11-15, wherein the process stream comprises heavy metals such as chromium or arsenic.

17. A method according to any of embodiments 11-16, wherein the process stream comprises fluoride.

The invention claimed is:

1. An electrocoagulation device configured to treat a process stream, the device comprising:
   a cathode;
   a sacrificial anode consisting of a compacted powder comprising iron and having a porosity between 11 and 62% by volume, wherein said anode is porous and water permeable;
   a pressure system, wherein the pressure system is configured for the process stream to flow through said anode,
   wherein said anode has a first side and an opposite second side, wherein the process stream flows from the first side through said anode to the second side,
   wherein a pressure of the process stream on the second side is less than the pressure on the first side, such that a pressure differential is at least 6.9 kPa (1 psi).

2. The device according to claim 1, wherein the pressure system is configured such that at least 50 wt % of the process stream flows through said anode.

3. The device of claim 1, wherein the pressure of the process stream on the first side is at least 13.8 kPa (2 psi).

4. The device according to claim 1, wherein said anode has a porosity between 22-51% by volume.

5. The device according to claim 1, wherein said anode consists of compacted and sintered powder.

6. The device according to claim 1, wherein the compacted powder comprises at least 90% by weight of iron.

7. The device according to claim 1, wherein the compacted powder comprises iron powder having a particle size distribution such that the amount of particles below 45 μm being at most 10% by weight, between 45 and 150 μm being 0-20% by weight, between 150 and 212 μm being 10-50% by weight, between 212 and 500 μm being 50-90% by weight and above 500 μm being 0-30% by weight.

8. The device according to claim 7, wherein said iron powder has a particle size distribution such that amount of particles below 45 μm being at most 5% by weight, between 45 and 150 μm being 0-20% by weight, between 150 and 212 μm 10-30% by weight, between 212 and 500 μm being 60-90% by weight and above 500 μm being 0-10% by weight.

9. The device according to claim 1, wherein said compacted powder comprises a mixture of compacted iron powder and aluminum powder.

10. The device according to claim 9, wherein the weight ratio between iron powder and aluminum powder 50:50 to 98:2.

11. A process for treating a process stream by electrocoagulation containing the following steps:
providing a device according to claim 1,
passing the process stream through the device by pressurizing the process stream before passing through said anode, while supplying an electric potential difference between said anode and said cathode.

12. The process according to claim 11, wherein when said anode and cathode are identical in structure, the process further comprises the step of:
switching polarity when a sacrificial part of said anode at least partly is consumed.

13. The process according to claim 11, wherein the process stream is pressurized above atmospheric pressure before passing through said anode.

14. The process according to claim 11, wherein said anode has a saturated hydraulic conductivity ($K_{sat}$) value of above 0 and up to 19 cm/day.

15. The process according to claim 11, wherein the process further comprises, prior to, and/or during the process of passing the process stream through the device, adjusting pH to a value which prohibits dissolution of formed hydroxide flocculants.

16. The method according to claim 11, wherein the process stream comprises at least one heavy metal.

17. The method according to claim 11, wherein the process stream comprises fluoride.

18. The method according to claim 11, wherein the at least one heavy metal is chromium.

19. The method according to claim 11, wherein the at least one heavy metal is arsenic.

* * * * *